(12) United States Patent
Shotton et al.

(10) Patent No.: US 10,372,504 B2
(45) Date of Patent: Aug. 6, 2019

(54) GLOBAL USAGE TRACKING AND QUOTA ENFORCEMENT IN A DISTRIBUTED COMPUTING SYSTEM

(71) Applicant: Akamai Technologies, Inc., Cambridge, MA (US)

(72) Inventors: Frederick R. Shotton, Piedmont, CA (US); Igor Levin, Sudbury, MA (US); Harutyun Movsisyan, San Francisco, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 89 days.

(21) Appl. No.: 15/682,018

(22) Filed: Aug. 21, 2017

(65) Prior Publication Data
US 2019/0042323 A1 Feb. 7, 2019

Related U.S. Application Data

(60) Provisional application No. 62/540,759, filed on Aug. 3, 2017.

(51) Int. Cl.
*G06F 15/16* (2006.01)
*G06F 9/50* (2006.01)
(Continued)

(52) U.S. Cl.
CPC ............ *G06F 9/5077* (2013.01); *G06F 9/465* (2013.01); *H04L 41/0893* (2013.01);
(Continued)

(58) Field of Classification Search
CPC ... G06F 9/5077; G06F 9/465; H04L 41/0893; H04L 41/5003; H04L 41/5022;
(Continued)

(56) References Cited

U.S. PATENT DOCUMENTS

| 6,108,703 A | 8/2000 | Leighton et al. |
| 7,240,100 B1 | 7/2007 | Wein et al. |

(Continued)

FOREIGN PATENT DOCUMENTS

EP 2791819 A1 10/2014

OTHER PUBLICATIONS

EU 18185232.8, European Search Report dated Dec. 14, 2018, 5 pages.

(Continued)

*Primary Examiner* — Thu Ha T Nguyen

(57) ABSTRACT

This patent document describes systems and methods for tracking the usage of a service provided by a distributed computing platform and for the enforcement of a global quota against such usage. In one embodiment, Servers in the platform are organized in a hierarchical manner. At the lowest tier resides a set of globally distributed servers, any one of which may receive and respond to client device requests. Multiple tiers of aggregation servers sit above the above the delivery tier. The first tier of aggregation servers receive usage measurements from the delivery tier. The second and higher tiers aggregate the usage measurements from lower tiers until a world level tier combines all usage measurements for a given service. Preferably, usage information is passed between servers in synchronization events. The systems and methods described herein are scalable, low latency, fault-tolerant, and incur relatively low computing overhead.

24 Claims, 7 Drawing Sheets

(51) Int. Cl.
*H04L 12/24* (2006.01)
*H04L 29/08* (2006.01)
*G06F 9/46* (2006.01)
*H04L 29/06* (2006.01)

(52) U.S. Cl.
CPC ...... *H04L 41/5003* (2013.01); *H04L 41/5022* (2013.01); *H04L 67/10* (2013.01); *H04L 67/22* (2013.01); *H04L 29/06* (2013.01); *H04L 41/0896* (2013.01); *H04L 67/02* (2013.01)

(58) Field of Classification Search
CPC ..... H04L 41/0896; H04L 67/10; H04L 67/22; H04L 67/02; H04L 29/06
USPC .......................................... 709/225, 226, 227
See application file for complete search history.

(56) References Cited

U.S. PATENT DOCUMENTS

| | | | |
|---|---|---|---|
| 7,373,416 B2 | 5/2008 | Kagan et al. | |
| 7,987,252 B2 | 7/2011 | Kagan et al. | |
| 8,346,907 B2 | 1/2013 | Kagan et al. | |
| 8,745,264 B1* | 6/2014 | Marr ....................... | H04L 67/42 709/235 |
| 9,436,579 B2 | 9/2016 | Hemmert et al. | |
| 9,509,804 B2 | 11/2016 | Stevens | |
| 9,654,579 B2 | 5/2017 | Stevens et al. | |
| 9,667,747 B2 | 5/2017 | Shotton et al. | |
| 10,015,107 B2* | 7/2018 | Marr ....................... | H04L 41/145 |
| 10,178,046 B1* | 1/2019 | Murugesan ........... | H04L 47/827 |
| 2004/0088423 A1 | 5/2004 | Pugh et al. | |
| 2005/0216421 A1* | 9/2005 | Barry .................. | G06F 11/0709 705/64 |
| 2006/0069671 A1 | 3/2006 | Conley et al. | |
| 2009/0164356 A1* | 6/2009 | Bakman ................. | G06Q 30/02 705/34 |
| 2009/0225763 A1 | 9/2009 | Forsberg et al. | |
| 2011/0283266 A1* | 11/2011 | Gallagher ................. | G06F 9/44 717/130 |
| 2012/0276867 A1* | 11/2012 | McNamee .......... | H04L 12/1407 455/406 |
| 2013/0021933 A1* | 1/2013 | Kovvali ................ | H04W 88/18 370/252 |
| 2013/0132854 A1* | 5/2013 | Raleigh ................. | G06F 3/0482 715/738 |
| 2013/0254260 A1 | 9/2013 | Stevens et al. | |
| 2014/0149475 A1 | 5/2014 | Darcy et al. | |
| 2014/0181285 A1 | 6/2014 | Stevens et al. | |
| 2015/0116745 A1* | 4/2015 | Niimura ............. | H04N 1/00954 358/1.13 |
| 2015/0143456 A1* | 5/2015 | Raleigh ................. | H04W 12/08 726/1 |
| 2015/0149611 A1* | 5/2015 | Lissack ............... | H04L 43/0817 709/224 |
| 2016/0241455 A1 | 8/2016 | Nguyen | |
| 2016/0373588 A1* | 12/2016 | Raleigh ................. | H04M 15/61 |
| 2017/0078922 A1* | 3/2017 | Raleigh ................. | H04W 28/10 |
| 2017/0187794 A1 | 6/2017 | Cherepanov et al. | |
| 2017/0295258 A1* | 10/2017 | Raleigh ................... | H04L 67/20 |
| 2018/0191814 A1* | 7/2018 | Kinarti .................. | H04L 67/104 |

OTHER PUBLICATIONS

Agrawal, Efficient Detection of Distributed Constraint Violations, COMAD, Dec. 14-16, 2006. Downloaded Jun. 2, 2017, 10 pages. Available at: https://www.cse.iitb.ac.in/~comad/2006/proceedings/23.

Behl, et al., DQMP: A Decentralized Protocol to Enforce Global Quotas in Cloud Environments, Proceedings of the 14th International Symposium on Stabilization, Safety, and Security of Distributed Systems (SSS' 12) downloaded on Jun. 2, 2017, 14 pages. Available at: https://www.ibr.cs.tu-bs.de/papers/behl-sss2012.pdf.

Cohen, Jeff et al. Keeping Track of 70,000+ Servers: The Akamai Query System, Proceedings of the 24th USENIX Large Installation System Administration Conference (LISA), Nov. 2010. 15 pages.

Keralapura, et al., Communication-Efficient Distributed Monitoring of Threshold Counts, SIGMOD 2006, Jun. 27-29, 2006, downloaded on Jun. 2, 2017, 12 pages. Available at http://dimacs.rutgers.edu/~graham/pubs/papers/cdtbresh.pdf.

Lakew, et al., A Tree-based Protocol for Enforcing Quotas in Clouds, downloaded on Jun. 2, 2017, 8 pages. Available: http://doras.dcu.ie/19993/1/A_Treebased_Protocol_for_Enforcing_Quotas_in_Clouds.pdf.

Lu, Ling Lu Recent Publications, downloaded on Jun. 2, 2017, 27 pages. Available at: https://www.cc.gatech.edu/~lingliu/publication.html.

Meng, et al. REMO: Resource-Aware Application State Monitoring for Large-Scale Distributed Systems, downloaded on Jun. 2, 2017, 8 pages. Available at http://www.cc.gatech.edu/~lingliu/papers/2009/Meng-icdcs09.pdf.

Meng, et al., Resource-Aware Application State Monitoring, IEEE Transactions on Parallel and Distributed Systems, downloaded on Jun. 2, 2017, 15 pages. Available at: http://www.istc-cc.cmu.edu/publications/papers/2013/remo_tpds.pdf.

Raghavan, et al., Cloud Control with Distributed Rate Limiting, SIGCOMM '07, Aug. 27-31, 2007, Kyoto, Japan, 12 pages.

Repantis, et al., Scaling a Monitoring Infrastructure for the Akamai Network, ACM SIGOPS Operating Systems Review, vol. 44, No. 3, Jul. 2010, 7 pages.

* cited by examiner

GLOBAL USAGE TRACKING AND QUOTA ENFORCEMENT IN A DISTRIBUTED COMPUTING SYSTEM

This application claims the benefit of U.S. Application No. 62/540,759, filed Aug. 21, 2017, the content of which is hereby incorporated by reference in its entirety.

BACKGROUND

Technical Field

This application relates generally to distributed computing systems and more particularly to systems and methods for enforcing global usage quotas in a distributed computing system where a client device may contact any of a large number of machines in the system to request service.

Brief Description of the Related Art

Content delivery networks and other distributed computing systems typically use a large set of servers to handle massive numbers of client requests. The servers may be deployed across the Internet, for example, in edge networks, peering point, or otherwise around the world. An important aspect of such systems is that a given client device making a request for a service and/or a given piece of content (e.g., an HTML document, an image) may be directed to a server that is best suited to respond to its request. That server may be any of a large number of servers in the system, and the selection may change over time. Request routing may be accomplished using the DNS system, Anycast, or other technique. See, for example, U.S. Pat. No. 6,108,703, the contents of which are hereby incorporated by reference.

Oftentimes, there is a desire to be able to track the usage of a given service across a platform. The motivation may be a need to monitor or understand system load for system administration purposes. In addition, for multi-tenant platforms, there may be a need to track the usage of each tenant (customer) for purposes of billing. Enterprise customers may have usage by their organizations and employees tracked for purposes of billing. Customers whose business involves providing web-services to others (e.g., as a web application on a website) and whose web services are provided by the platform may also have their usage monitored in order to be billed by the platform provider.

Another aim—related to tracking usage—is to enforce a quota on the amount of usage of a service. An example is to allow only a given number of client device requests during a given time period. This can be done for any of a variety of reasons, e.g., to ensure system stability, to enforce contractual terms between the platform service provider and a platform customer, or otherwise.

Tracking and enforcing a global quota across machines in such a distributed system, at scale, with low latency, with a fault-tolerance, with relatively low computing overhead, and with reasonable accuracy, is a significant technical challenge.

The teaching hereof are directed to improved methods, systems, and apparatus for tracking the usage of a given network service in a distributed computing system with many client-facing machines. The teachings hereof can also be extended to track client requests for content. Other benefits and improvements will become apparent from the teachings herein.

BRIEF DESCRIPTION OF THE DRAWINGS

The invention will be more fully understood from the following detailed description taken in conjunction with the accompanying drawings, in which.

DETAILED DESCRIPTION

Figure 1:
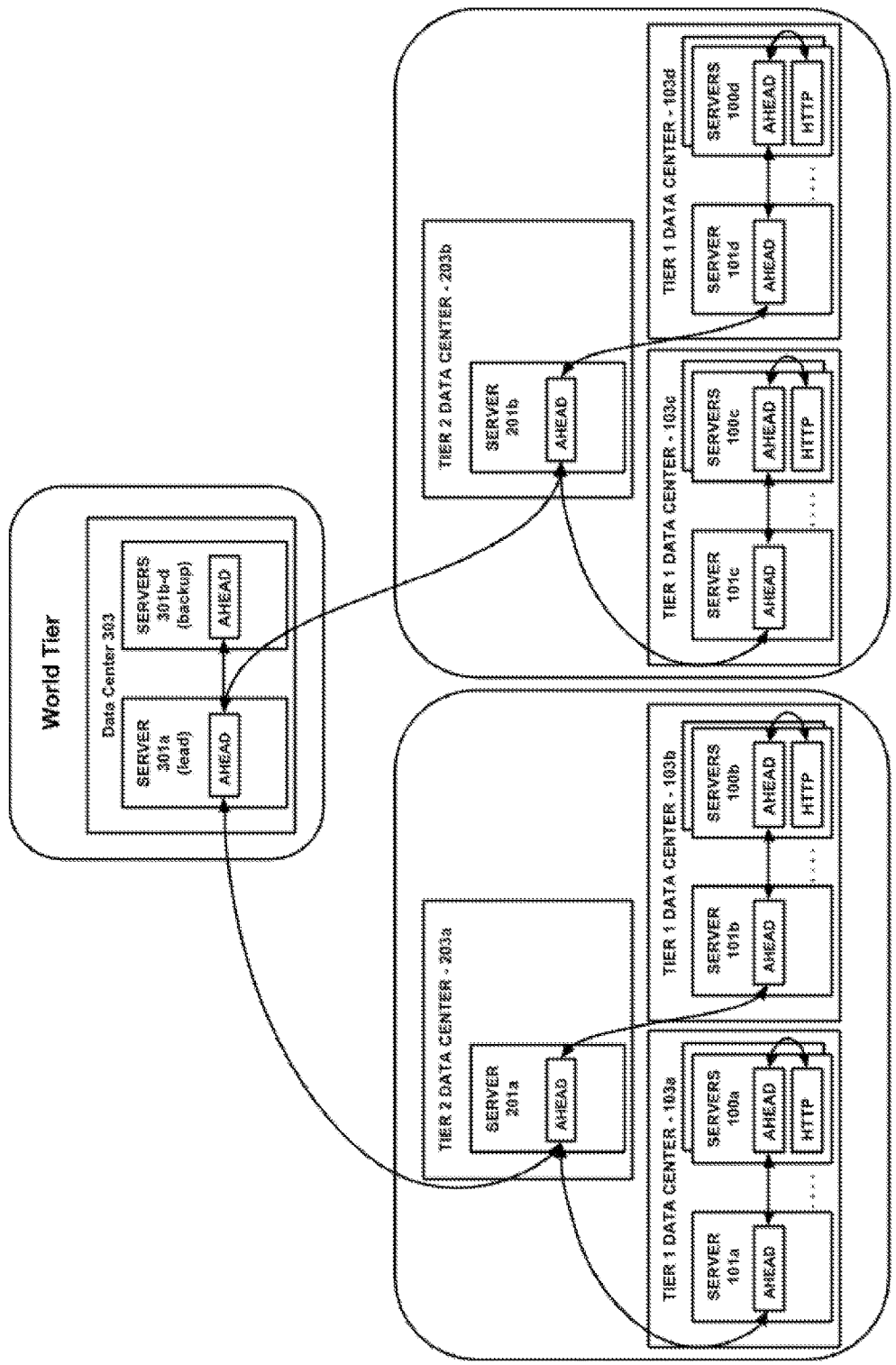
FIG. 1 is a schematic diagram illustrating an embodiment of a hierarchical usage tracking and quota enforcement system.

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

This patent document describes systems and methods for tracking the usage of a service provided by a distributed computing platform and for the enforcement of a global quota against such usage. In one embodiment, Servers in the platform are organized in a hierarchical manner. At the lowest tier resides a set of globally distributed servers, any one of which may receive and respond to client device requests. Multiple tiers of aggregation servers sit above the delivery tier. The first tier of aggregation servers receive usage measurements from the delivery tier. The second and higher tiers aggregate the usage measurements from lower tiers until a world level tier combines all usage measurements for a given service. Preferably, usage information is passed between servers in synchronization events. The synchronization event preferably involves a child server sending usage measurement updates for specific services in the form of incremental usage values (diffs) to the parent server, and the parent updating the child as to the current overall usage of that specific service as seen by other parts of the system. Quota enforcement is preferably local based on this information. The systems and methods described herein are scalable, low latency, fault-tolerant, and incur relatively low computing overhead.

Definitions

In the context of the present document the following terms have the following meanings.

TABLE 1

Definitions

| Term | Description |
| --- | --- |
| API EndPoint | An application hosting one or more web services with a common base path (e.g. . . . /calculator). An API is typically designated with a hostname and may include part of a path. An API provides a set of one or more services. |
| Service or Resource | A web service hosted at a destination specified by the trailing path components on a URL (e.g./calculator/add,/calculator/v1/subtract, /calculator/. . ./multiply). |
| API Key | A string extracted from a client request (e.g., query string, cookie, header, JWT token hostname, path, other portion of URL, or otherwise) that represents an service user, a group of users, or an application. Also could be defined as a combination of one or more such strings. |
| API-id | A 16 bit value unique to a platform customer representing a set of API Endpoints to which a quota applies. |
| KEY-id | A 24 bit value unique across customers corresponding to an API Key value known by the portal and transmitted in configuration to an API delivery server. In that server a lookup table gives the KEY-id, given a salted hash of the API Key from a received client request.<br>While in this embodiment a KEY-id corresponds to a given customer, in alternate designs, the KEY-id could be made to be non-unique; the counter ID could nonetheless be unique as a combination of the API-id and KEY-id. |
| AHEAD | A component "Akamai Hierarchical Edge Aggregator and Disseminator" described in this document to track usage and implement global quotas and other features. |
| Counter Table | The counter table is a table maintained by an aggregator to maintain state for active counters. Also referred to as a hash table. |

System Introduction

FIG. 1 illustrates a system at a high level, in one embodiment. The system has an API delivery tier composed of API delivery servers 100a-d, and three tiers of aggregation servers. Aggregation servers 101a-d in the first tier, 201a-b in the second tier, and 301a-d in the world tier. (The aggregation servers are sometimes referred to simply as 'aggregators' in this document.) The API delivery servers 100a-d are computers that provide API endpoints for a variety of APIs and services provided by the platform. Each of the blocks of servers represents one or more such servers, i.e., API Delivery Server 100a represents one or more servers all connected to aggregation server 101a; API Delivery Server 100b represents one or more servers all connected to aggregation server 101b; API Delivery Server 100c represents one or more servers all connected to aggregation server 101c; API Delivery Server 100d represents one or more servers all connected to aggregation server 101d.

API delivery servers 100a-d may be edge servers, or servers deployed at a peering point, or in any manner on or around the Internet. They may be part of a content delivery network. As used herein the term API includes delivering access to a web application, or the like, and includes both public and enterprise network applications. Any of a variety of software services may be provided through the API, and the system illustrated in FIG. 1 may be operated and managed by a service provider for that purpose, e.g., as software as a service provider, platform as a service, provider infrastructure as a service provider.

A client device sending an API request for a particular service may discover an API delivery server in the system to contact by executing a DNS lookup for a hostname associated with the API and receiving in response an IP address of one of the API delivery servers 100a-d. The DNS system may select the API delivery server to respond with based on the geographic location of the client device, server loads, or other factors. Other request routing approaches known in the art, e.g., Anycast, may be used too.

The API delivery servers 100a-d preferably include an AHEAD module in communication with an HTTP server application, and preferably the HTTP server application is an HTTP proxy server application. In FIG. 1 these are marked as AHEAD and HTTP, respectively. The AHEAD module is preferably a software process; but could also be implemented partially or entirely in hardware. The AHEAD module is tasked with coordinating with the system to track usage of the API; the HTTP proxy server application handles client requests and delivers the services provided via the API. As part of doing so, the HTTP proxy server applications may proxy client requests to an origin data center (not shown). This means that requests for service that cannot be satisfied locally (e.g., using local processing and/or by sending locally cached content) can be the basis for a forward request to an origin server to retrieve the requested data or data pertinent to the request from which the API delivery server can construct a response for the client.

Typically, a set of multiple API delivery servers is deployed in each of multiple data centers. Such a deployment in the data center is sometimes referred to as a point of presence or PoP. In FIG. 1, the data centers are designated by labels 103a-d. In this embodiment, each data center 103a-d has a designated tier 1 aggregation server 101a-d. This means that, from time to time, the API delivery servers 100a in data center 103a will synchronize usage data with tier 1 aggregation server 101a. API delivery servers 100b in data center 103b will synchronize usage data with tier 1 aggregation server 101b, and so on. For descriptive convenience, the aggregation server for a given group of API delivery servers is sometimes referred to in this document as the "parent" for those API delivery servers. The API delivery servers are referred to as the "children".

In the embodiment shown in FIG. 1, each tier 1 aggregation server 101a-d is in turn associated with a tier 2 aggregation server 201a-b in a child-parent relationship. Each tier 2 aggregation server 201a-b is in turn associated with a world aggregation server 301a in a child-parent relationship. The third tier is referred to as the "world" tier in this case because it is the top level tier in this implementation. There could be any number of additional intermediate tiers, but the top level is referred to as the world tier to indicate that it is the final tier in the hierarchy.

The world tier is typically composed of a lead world server 301a (sometimes referred to in this document as "World" or "lead world tier aggregator"), with one or more backup world tier servers 301b-d. In general the lead world tier aggregator 301a takes the actions described in this document; the backup world tier servers 301b-d merely replicate the state of the lead server 301a (e.g., via periodic checkpointing). One of the backup world servers 301b-d can take over if and when the lead world server 301a fails; this may be done using any known leader election algorithm, round robin, least loaded, static configuration, etc.

It should be noted that virtually any criteria can be used to determine the particular tier 1 aggregation server 101a-d that an API delivery server 100a-d should use as its parent. The parent assignments may be static or dynamic. In one embodiment, an API delivery server executes a DNS lookup to a designated hostname in order to receive one or more IP addresses of its parent. A single or two-level DNS resolution may be employed, as described in U.S. Pat. No. 6,108,703, the teachings of which are hereby incorporated by reference in their entirety. The DNS system may decide which parent to return based on the location of the API delivery server, the load on candidate parents, or any other factors. The teachings hereof may be used with any method for determining parent-child servers, as such decision-making is not crucial to the inventions disclosed herein.

Figure 2:
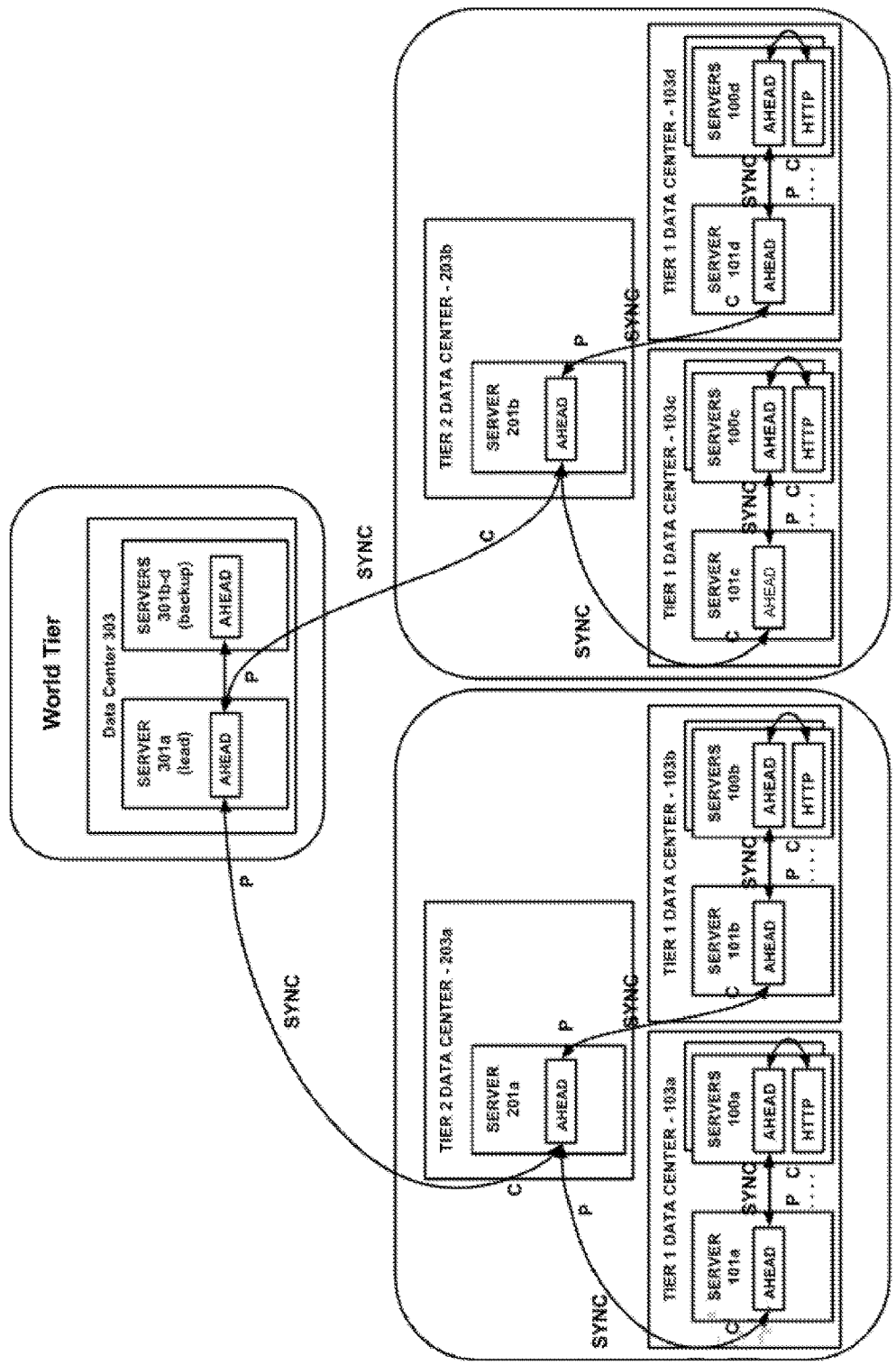
FIG. 2 is a schematic diagram illustrating synchronization operations in the system shown in FIG. 1.

FIG. 2 illustrates, in one embodiment, synchronization processes that take place in the system of FIG. 1. The bolded SYNC line indicate synchronization events, with labels indicating the server that plays the role of Parent (P) or Child (C) for each synchronization event. Synchronization is performed to keep track usage of the various services that are being provided to client devices by the API delivery servers 100a-d (and more particularly, by the HTTP proxy server applications).

As shown in FIG. 2, in operation, child servers synchronize usage with their parents at each level of the hierarchy. The synchronization is preferably periodic, but it can be asynchronous (e.g., upon some event, such as an accumulation of a certain amount of unreported usage at a server.) The synchronization process may be initiated by either the child or the parent, but in a preferred embodiment, the child server sends a synchronization request message to its parent. The child server uses the synchronized usage information to enforce the quota locally during the next cycle.

The usage of a service may be measured in a variety of ways, but in one embodiment, the usage metric for a service is composed of a count of client requests for a particular service of a particular API during a given period.

API Delivery Server to Tier 1 Aggregator Synchronization

In a preferred embodiment, a (child) API delivery server's HTTP proxy server application periodically synchronizes the counters it uses by sending a request to the AHEAD module on the same machine via a local interprocess communication (such as UNIX domain socket) and waiting for the response. An example period is every 200 milliseconds (5 times per second, optionally plus some jitter). The AHEAD module will determine the tier 1 aggregation server (parent) and send it an synchronization request message. The synchronization request preferably contains a list of counter identifiers along with flags. For each counter identifier, the request includes the last known count for the counter identifier (as known to the child from the last synchronization), and a difference value. The difference value is also referred to herein as a "diff" or as a "delta" value without any change in meaning. The difference value represents the number of client requests that the child has received for that counter identifier since the last synchronization. The purpose of having the child pass the last known count to the parent in the synchronization request is to enable a parent to rebuild state in case of a failover from one parent to another parent, or other data loss or corruption on the parent.

The parent's response to the synchronization request contains, for each counter identifier in the request, an updated flag value and an updated count. The updated count may or may not include updated amounts from higher tiers, but it does include the difference values of all children that have synchronized with that particular parent (i.e., that particular tier 1 aggregation server). Once the parent synchronizes its counters with a higher tier, as happens periodically, then the updated count will reflect the diffs of all the children of that higher tier. Eventually synchronization with the world tier will occur, at which point the world count is disseminated down the tiers as synchronizations continue.

The request/response synchronization messaging is preferably performed over persistent connections that are secured with TLS.

Tier 1 to Tier 2 Synchronization

Preferably, a tier 1 aggregation server synchronizes about every 1 second (optionally plus some jitter) with its parent, which is a tier 2 aggregation server. The tier 2 aggregation server can be discovered via a DNS request to a mapping system that responds with an ordered list of candidates (e.g., 10) that are geographically the closest, lead loaded, or otherwise. If the parent selected is actually not the tier 2 aggregation server for the given geography, then the aggregation server that is contacted nevertheless can take up the role of parent and lead as a tier 2. Multiple leaders can occur for short periods of time until mapping updates have been distributed. This does not affect consistency of data. Only the world tier needs to have a single leader.

The actual synchronization process proceeds in the same manner as described above between the API Delivery Server and the tier 1 aggregator. In this case, however, the tier 1 aggregation server now acts as a child and the tier 2 aggregation server is the parent.

If there were additional intermediate tiers, then they can occur as described above (e.g., tier 2 to tier 3 synchronization, tier 3 to tier 4 synchronization, etc.) In this embodiment, the third tier is the top and thus the world tier.

Tier 2 to World Synchronization

Preferably, the tier 2 aggregation server synchronizes about every 1 second (plus some jitter) with its world tier parent. Discovery and synchronization of world tier machines is the same as tier 2, except preferably different servers are returned from the DNS system. The tier 2 aggregation servers are now acting as the child, and the lead world aggregation server is the parent.

The lead world aggregation server should be a singleton and failover gracefully to other backup world servers as necessary. This will be described in more detail later.

The lead world aggregator is responsible for counter resets at the end of their quota interval, processing manual resets from users/administrators, protecting against counter loss, pushing over quota counters down to tier 2, and ensuring counter consistency.

Quota Enforcement

Quota enforcement is local. The AHEAD module in a given tier 1 aggregation server will have a list of all counters that have exceeded quota, as received from higher tiers. The HTTP proxy server application in the API delivery server can quickly determine if a counter has exceeded its quota from local information, if available. If not, it waits to synchronize with a tier 1 aggregation server so that it knows if the counter has exceeded quota. If the tier 1 aggregator was not already actively synchronizing the counter that the API delivery server is requesting (i.e., due to another API delivery server also requesting synchronization), then there will be some latency until the synchronization is complete. Worst case this will be about 2 s to 5 s of latency if necessary to go up to the world lead.

System Enhancements

System performance can be enhanced by adopting strategies to reduce the frequency of synchronization under certain circumstances. For example, in some embodiments, one can apply rules that allow for less frequent synchronization for those counters below a certain percentage of the quota limit. Such rules are preferably applied only if the quota limit is sufficiently large (i.e., a minimum value), because a burst of traffic to a small quota limit may cause large jumps in the percentages. One can also use rules that allow for less frequent synchronization for counters that are over quota. For example, preferably counters over quota are not synchronized anymore until they reach five seconds before the end of the reset period (i.e., the time at which the quota period will end and reset to zero). At that point, they begin synchronizing again. In another enhancement, counters that have not seen any traffic for some time (e.g., four hours) can be dropped from synchronization automatically. Yet another enhancement is to have each API delivery server 100 enforce a limit on the number of counters in its local memory and drop excess counters using a least-recently-used algorithm or other approach. Yet another enhancement is to have a child synchronize less frequently (e.g., back off by 400 milliseconds) if a parent indicates that it is overloaded by setting a flag in its synchronization response message.

System Scaling

The number of tiers and of servers can be adjusted depending on design goals and expected load, taking into account such factors as overall latency, desired CPU load, existing deployments/footprints, network bandwidth, and the like. No particular configuration is crucial to practice the teachings hereof. Tables 2.1 and 2.2 below set forth example configurations. However, all of these parameters depend on characteristics of the computer hardware at hand, their deployment, the number of counters, and the design goals of a particular implementation.

TABLE 2.1

Example System Configurations

| Settings | Model 1 | Model 2 | Model 3 | Model 4 | Model 5 | Model 6 |
|---|---|---|---|---|---|---|
| Max counters | 1,000,000 | 1,000,000 | 1,000,000 | 10,000,000 | 10,000,000 | 10,000,000 |
| API Delivery Server counters | 10,000 | 10,000 | 100,000 | 100,000 | 100,000 | 100,000 |
| Tier 1 counters | 50,000 | 50,000 | 200,000 | 200,000 | 200,000 | 200,000 |
| Tier 2 counters | 0 | 0 | 300,000 | 300,000 | 300,000 | 300,000 |
| Tier 3 counters | 100,000 | 100,000 | 500,000 | 1,000,000 | 1,000,000 | 1,000,000 |
| In-region refresh rate | 0.20 | 0.10 | 1.00 | 1.00 | 1.00 | 0.20 |
| Tier 1 child count | 40 | 40 | 40 | 40 | 40 | 40 |
| Tier 2 child count | 0 | 0 | 20 | 12 | 12 | 0 |
| Tier 3 child count | 120 | 120 | 13 | 10 | 10 | 120 |
| World child count | 10 | 10 | 5 | 10 | 10 | 10 |
| Tiers (incl. world) | 3 | 3 | 4 | 4 | 4 | 3 |
| Partitions | 1 | 1 | 1 | 2 | 4 | 4 |

TABLE 2.2

Example System Configurations

| Settings | Model 7 | Model 8 | Model 9 | Model 10 | Model 11 | Model 12 |
|---|---|---|---|---|---|---|
| API Delivery Server counters | 1,000,000 | 1,000,000 | 1,000,000 | 10,000,000 | 10,000,000 | 10,000,000 |
| Tier 1 counters | 10,000 | 10,000 | 100,000 | 100,000 | 100,000 | 100,000 |
| Tier 2 counters | 20,000 | 20,000 | 150,000 | 200,000 | 200,000 | 200,000 |
| Tier 3 counters | 0 | 0 | 200,000 | 300,000 | 300,000 | 300,000 |
| Tier 4 counters | 100,000 | 100,000 | 400,000 | 1,000,000 | 1,000,000 | 1,000,000 |
| In-region refresh rate | 0.20 | 0.10 | 1.00 | 1.00 | 1.00 | 0.20 |
| Tier 1 child count | 40 | 40 | 40 | 40 | 40 | 40 |
| Tier 2 child count | 0 | 0 | 26 | 26 | 26 | 0 |
| Tier 3 child count | 250 | 250 | 20 | 20 | 20 | 250 |
| World child count | 20 | 20 | 10 | 10 | 10 | 20 |
| Tiers (incl. world) | 3 | 3 | 4 | 4 | 4 | 3 |
| Partitions | 1 | 1 | 1 | 2 | 4 | 7 |

Other techniques that can be used to scale the system include:

- Compression to reduce synchronization message sizes. Delta encoding and/or fast integer compression on columns within the list of counters. One example is FastPfor library.
- Configuring the second tier with a large number of points of presence (relative to others), which makes CPU usage and bandwidth high but provides the benefit of low latency counts for each second tier area.
- Vertical scaling: Increasing the number of tiers reduces messaging bandwidth but increases latency
- Decreasing the in-PoP refresh rate.
- Changing the ratio of children to parents at each aggregation tier.
- Horizontal scaling: partitioning the counter identifier numerical space within process and/or across servers. Using this approach, each partition has its own counter identifier range, and its own DNS hostnames and maps to locate parents. This means that a subset of counter identifiers are mapped to a given hierarchy tree, and there are multiple hierarchies. Partitioning allows scaling to an extra order of magnitude as well as providing different aggregation latencies and settings for different types of identifiers. It is possible to assign new hostnames per partition and reuse tier DNS maps. An example number of partitions is in a range of 1-7, or more.
- The maximum number of counters supported is influenced by the in-cluster refresh rate and the average number of counters per machine. It does not matter so much that the maximum number of counters is 1M or 10M, barring hotspot regions such as mobile gateways serving the traffic for many customers.

Combining Roles—Aggregation Server and API Delivery Server in Single Machine

Figure 3:
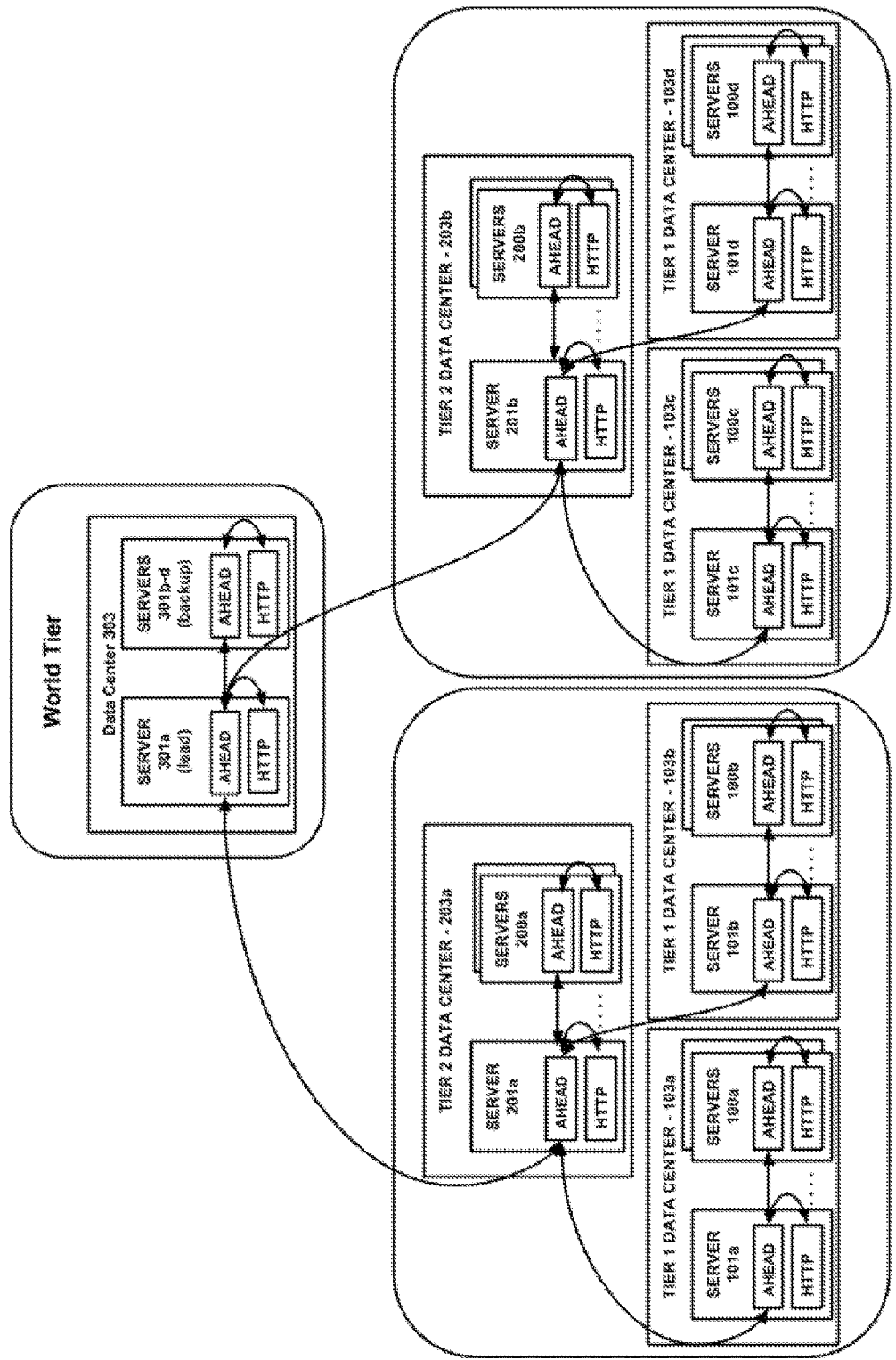
FIG. 3 is a schematic diagram illustrating and embodiment of a hierarchical usage tracking and quota enforcement system with dual-role servers.

FIG. 3 illustrates a preferred embodiment in which a given server (for example, see server 101*a*) fulfills both the role of the API delivery server and the role of a tier 1 aggregation server. This means that the given machine can execute both an HTTP proxy server application to serve content to end-user client devices, as well as an AHEAD module configured to provide tier 1 aggregation server functionality. This also means that the tier 1 aggregation server (acting as parent) is can be deployed in the same cluster or PoP as its "child" servers. In such scenarios, the tier 1 aggregation server is referred to as the "lead" tier 1 aggregation server herein. Over time the role of lead can be passed to different machines in the cluster. The parent-child synchronization may be referred to as "in-cluster" or "in-region" synchronization. Synchronization can occur over TLS using a backend network amongst the server machines in the cluster. The tier 2 and other aggregation tier server likewise can be a server machine in a data center playing a dual-role, as shown in FIG. 3.

More detail about aspects of the system are now provided. These details are examples and not intended to be limiting.

Quota Algorithm

In a preferred embodiment, the quota algorithm is enforced by an API delivery server 100 upon reading a request, including request headers, from an end-user client device. Based on the client device's request, the local AHEAD module will identify the API endpoint, the service identifier, and whether a counter and associated quota applies to the API endpoint and service identifier combination. If the API delivery server has not seen the counter before, the API delivery server can block the request until a synchronization with the tier 1 aggregator has occurred, in order to determine if the counter is over quota or to determine the current count.

The current count that the API delivery server is able to get from its parent may be at a tier 1 tier consistency, or a higher tier consistency, up to and including world tier consistency. The term tier consistency refers to the synchronization state of a counter in the system. For example, if a server reports a count with a tier 1 consistency, this means that the count is up to date at tier 1 level, but synchronization with higher tiers has not occurred. A world tier consistency means that the count value has been synchronized up to the world tier, meaning it reflects updates from the entire system.

Counters that are over quota are identified and this fact automatically distributed to all tier 1 aggregators down from the world tier. Hence, most of the time contacting the tier 1 aggregator is enough to determine if a counter is over quota. The world tier is authoritative counts for all counters. Lower tiers that are actively synchronizing a particular counter will have older snapshots of the world tier counts. If a lower tier has not yet synchronized a particular counter with a higher tier, that counter will have a count consistent with its tier level.

The option to block a client request is preferably on by default. The blocking operation is preferably restricted to a timeout limit, e.g., a maximum of one synchronization cycle (e.g., 1 second). In this way, it may be thought of as a temporary "hold" operation. The purpose of the operation is to allow an API delivery server 100 to rapidly discover if an unknown counter is over quota within the last synchronization cycle time period. If the parent (tier 1 aggregator) has not seen the counter before then it will take one synchronization cycle to get the count from its parent in the second tier. If that second tier parent has not seen the counter before then it will take another one or two synchronization cycles to get the count from the world tier (assuming a three-tier system so that third tier is the world tier) down to the second tier. Preferably, an API delivery server 100 or lower tier aggregator unsubscribes from a counter after some time of inactivity (e.g., four hours) which again requires a blocking synchronization to get a more accurate count. By unsubscribing it is meant that the machine does not list the counter identifier in its synchronization request to its parent.

It is preferable that an API delivery server does not deny a client request unless the aggregated count received from the last synchronization plus any local requests since the synchronization exceeds the quota limit.

Preferably there is a limit on the number of requests that can be blocked at one time (e.g., 10,000) by an API delivery server. Once over limit, additional requests are not added to counters, which mitigates against injection of large numbers of counters into the system (e.g., as an attack or because of error). Upon timeout or exceeding the cap a configurable response can occur: respond with 503 (default), deny with 429 and rate limit headers, or allow with rate limit headers.

This all means that the system may allow the quota to overshoot the maximum during the period of the aggregation feedback cycle. For many use cases, particularly in large distributed systems, this is preferable to a system that blocks requests for the sake of greater accuracy.

Counter Definition

A counter is identified by a uint64_t unique value. The identifier is formed by combining the fields below in Table 3, with higher order bits listed from top to bottom.

TABLE 3

Counter Identifier

| Bits | Field | Description | Use Case |
|---|---|---|---|
| 3 | Product ID | Partition by product ID. | |
| 21 | Feature ID | Products can use any identifier. | Set to 0 if not used. |
| 40 | Counter Key ID | 40 bit namespace for key information. | 16 bits: API-id 24 bits: key-id |

The Counter Key Identifier (Counter Key ID) is composed of the API identifier (API-id) and key identifier (key-id). The API-id namespace represents a set of API endpoints on the system. The key identifier (key-id) represents, for a given API endpoint, a dedicated namespace for each customer operating on the multi-tenant platform. Put another way, for each API endpoint, there is a 24 bit space to identify unique counters.

Preferably, the key-id can be configured by the customer and maintained in a database. For example, a customer using the system for API delivery can access a user interface and configure the system. The user interface can be a portal website hosted on a web server backed by a database. The customer can configure the system by creating a counter for a particular API, and defining the criteria to match when that counter should increment. Typically, the applicable counter is determined based on information extracted from the client request. The key id may be based one or more of: hostname, subdomain, URL path, URL query parameter, another portion of a URL, cookie value, end-user, client device id (e.g., from a certificate or otherwise), client device type, request method, request arguments, string in the request, time of day, and/or others. The key id can also be based on a particular kind or type of processing invoked by the service delivery tier, e.g., a particular feature or product offered by the service delivery platform. A system administrator or operator may also configure the key-id. Hence, by configuring the definition of a key-id, very specific kinds or types or sources of client device requests can be tracked in the system.

The API identifier may be configured similarly. Typically, the API-id is determined based on hostname or portion of a URL (e.g., hostname plus at least a portion of pathname) in the client-device request.

The user interface of the system can enforce limits on how many counters can be used per customer by restricting the number of key-ids available in the key-id space.

The identity and configuration of a counter can be delivered to the system—and to each API delivery server—using a metadata approach. A metadata approach involves sending a markup language control file to the API delivery servers. At the time of a client-device request, and based on the hostname, portion thereof, URL, portion thereof, and/or other aspects of the client device request, the control file is selected and used or processing. More information about metadata can be found in U.S. Pat. No. 7,240,100, the teachings of which are hereby incorporated by reference in their entirety. The metadata for the counter can also be managed and delivered in the manner specified in U.S. Pat. Nos. 9,509,804 and 9,654,579 and 9,667,747, and US Patent Publication No. 2014-018185, the contents of each of which are hereby incorporated by reference in their entireties.

Thereafter, an API delivery server determines which counter identifier to associate with a given request as defined in metadata logic.

In sum, during operation at the API delivery server, the 40 bit Counter Key ID can be formed by taking a hex API-id and appending a hex key-id and putting it into the key metadata tag along with Product ID and Feature ID. For example for API-id 'AB05' and key-id 'FD07AB' we get a counter string of '0-0-xAB05FD07AB' which is converted to a uint64_t in code.

Counter Aggregation

In a preferred embodiment, a child sends difference values ("diffs") to its parent. Put another way, a child sends incremental data in the form of diff values to its parent, to be incorporated into the higher-tier counts.

All tiers synchronize using a counter identifier field (explained above), and for each counter identifier, a count field (the value of the counter), and a diff field. The parent adds the child's diff to its own diff (which includes its own dif and accumulated diffs from other children that it has received). The parent returns an updated count equaling the value [count+diffs] to the child, where the count is usually the parent's last known count from the last time that the parent synchronized with its own parent. The child receives the updated count, replaces its last known count with the updated count, and sets its diff to zero. In a preferred embodiment, the child checks a flag in the response that, if set by the parent, indicates that the last known count of the child and the updated are already the same. If so, the child can skip the updating of the count in its local data store, saving time.

The parent becomes a child and contacts its own parent to synchronize.

The reason for the child sending its last known count to the parent is in case the parent has failed or and has failed over, or otherwise the count has been lost or corrupted, and therefore the new parent needs to restore the count field. A flag is exchanged to deal with certain corner conditions, these are explained in more detail later.

The world tier does not have a parent; thus it can immediately add diffs from a child into its master count; it does not need to maintain a last known count and diffs.

Using the approach outlined above, a parent does not need to keep track of the count or a diff value for a child. Further, a parent does not need to implement a "generation" algorithm to guard against counting each counter only once per one of its synchronization periods. In addition, in outlier cases where more than one parent is active for a given child, this approach eliminates the risk of double-counting the given child's counts.

To protect against under-counting and over-counting, preferably the following rules are applied: (1) When a child attempts to send a diff to a parent and a write timeout or connection abort occurs, the child assumes its diff values not accepted. If the parent crashed then the diff values are lost anyway. If the parent did not cras2) When child waits for response from parent and gets a read timeout, the child should assume the diff values were accepted. The parent upon write timeout should do nothing.

Counter Flags & Expiry

Preferably, only the lead world tier aggregator will be allowed to expire counters and reset them. This protects against clock skew on the network. Each counter has the following expiry/reset related flags and fields; these are sent when synchronizing, along with the counter identifier and other counter information already provided above:

1. Quota period: Upon the lead world tier aggregator seeing a counter for the first time, a new reset time is computed. The reset time if the time at which the count value will be reset to zero, and thus when over quota services can begin servicing clients again. If the lead world tier aggregator detects a change in the interval, then the counter value is reset.

2. Manual counter reset iteration: A 2 bit value that is incremented (and rolled over) by lead world tier aggregator for each manual reset event on a counter within a period. When a manual reset occurs this flag is incremented, the count is set to the reset value, and the over quota flag is cleared. This flag is used for integrity when setting "over quota" and during failover when deciding if a child counter can overwrite a parent counter.

3. Over quota flag: Set by an API delivery server 100 to indicate that the counter is over quota. The lead world tier aggregator can clear the flag on a reset. An API delivery server should only set this flag if the manual reset iteration field above matches. A match means the reset operation has trickled down to API delivery server from the lead world tier aggregator. It prevents a race operation of over quota being set before the API delivery server is aware of the reset at the world tier. When the lead world tier aggregator sees a change in over quota status, or the second tier sees the quota set by a child, the counter is put in a list that is sent to all children, preferably, all the way down to the tier 1 aggregators. In an alternate embodiment, the list could be sent all the way down to the API delivery serves, however this places larger demands on the number of counters that such servers must store.

4. Count: uin32_t count value of counter.

5. Reset time: epoch time at which a counter will be reset, preferably time_t type or int64_t. This value is calculated from the flags and stored in a counter table to facilitate quick checks on expiry/reset. Preferably the check is performed on periodic sweeps (e.g., every 5 seconds) of the counter table and on-demand as the counter is accessed by world tier only. If expiry occurs during a sync, then the counter is reset before incorporating the child diff. Resetting the counter typically involves, e.g., resetting the count, interval parity, over quota flag, and reset time.

6. Interval parity: a 1 bit flag set by the lead world tier aggregator. This flag is set on an "even" period. It is used when re-creating a reset time to ensure that the system does not miss a reset in situations such as world failover (in other words, replication occurs followed by failover after the quota period boundary) or when re-seeding a counter.

Reset jitter is preferably added to the reset period. Preferably, the first (least-significant-bits) 5 bits of the counter identifier provide a jitter value of 0 to 30 seconds (and value 31 s is rounded down to 30 s). This is multiplied by the quota period providing a total of 186 buckets. It spreads out the reset times to spread out the processing of counter-resets for over quota counters, avoiding load spikes. Example values are:

For a reset time of an hour: reset jitter of 0-30 seconds
For a reset time of 6 hours: reset jitter of 0-1 minutes
For a reset time of 12-Hours: reset jitter of 0-2 minutes
For a reset time of a day: reset jitter of 0-4 minutes
For a reset time of a week: reset jitter of 0-8 minutes
For a reset time of a month: reset jitter of 0-16 minutes For active and synchronized counters, there will be a propagation delay for the count/quota resets to make their way down the world tier back to an API delivery server. There will be a discrepancy between the reset time and the value of 'X-RateLimit-Next' time returned in client responses. A metadata tag can be used to add time back to bring this closer to reality (i.e., the time needed for a counter reset to travel from world tier to tier 2 and down to tier 1). This might be, for example, 2 seconds to this value to bring it closer to reality. The reset jitter is also added to the value of 'X-RateLimit-Next.

Manual Reset

Preferably, the system allows a user to manually reset specific counters, to set them to a particular count value, and/or to override the over quota status without modifying the count. To do this, a user may access the portal and designate which counters to reset and/or what values to use, by counter identifier. The portal creates a corresponding record in a database associated with the portal. On a periodic basis (e.g., every 30 seconds), the lead world tier aggregator polls the database. If it finds new records, it pulls those records and processes the resets. The old records in the database expire after a time to clean out the database.

In an alternate embodiment, there can be duplex communication channel between the portal and the world tier; this enables the portal to push notifications of manual resets.

Note that if the system is partitioned, then the lead world tier aggregator for each partition preferably only pulls records in the counter identifier numerical space to which it is assigned.

Counter Table

The counter table is a table maintained by an aggregator to maintain state for active counters. An example record for the counter table is provided below in Table 4. The actual table would be the compilation of many such records.

TABLE 4

Counter Table Record

| Field | Type | Description |
| --- | --- | --- |
| counter_id | uint64 | Counter Identifier (described in Table 3). The counter to which this record in the table pertains. |
| flags | uint32 | See Table 5 below for full description of flags. |
| count | uint32 | The last-known count known to this aggregator. For world tier, it is the authoritative total count. For lower tiers, it is an old copy of the world authoritative count (i.e. from the last synchronization), or a count with non-world consistency. |
| | uint32 | Difference value to apply to the count, i.e., pending difference value. An child employs this field as follows when contacting a parent:<br>1) send diff + diff_to_parent<br>2) set diff = 0<br>3) diff_to_parent = diff + diff_to_parent<br>When receiving parent response:<br>1) diff_to_parent = 0 |

TABLE 4-continued

Counter Table Record

| Field | Type | Description |
|---|---|---|
| | | If the synchronization to parent fails due to abort or write timeout:<br>1) diff += diff_to_parent<br>2) Diff_to_parent = 0<br>This field is unused on the world tier aggregators. |
| diff_to_parent | uint32 | A temporary copy of a difference value maintained whilst syncing with parent. This field not required but it is useful as a safety mechanism: if synchronization with parent fails due to abort or write timeout, this field is added back to diff. If a successful read timeout occurs, the diff_to_parent is cleared. In this way, diff accumulation during a failed synchronization process is properly tracked.<br>This field is unused on the world tier aggregators. |
| reset_time | int64_t | The epoch time in seconds for the next reset time for the identified counter.<br>It is preferably computed from the flags and stored as part of the hash table for optimization reasons. It is consulted by lead world tier aggregator in a periodic (e.g., every 5 seconds) read of the counter table for expiry processing. It is also consulted on-demand as counters are accessed.<br>This field is only used on the world tier aggregators. |
| start_sync | int64_t | The epoch time in seconds to resume synchronizing for a counter over quota: 5 s before the end of the reset period<br>It is set when an over quota counter with world consistency occurs. It is cleared when reaching the time.<br>This field is unused on the world tier aggregators. |

When syncing, the AHEAD module (whether in an aggregator or API delivery server) generates a sorted list of counter identifiers in order to compress them. A map could be used instead and would allow iterating the counters in sorted order; however the tradeoff would be longer lookup time. In a preferred embodiment, therefore, the AHEAD module iterates in unsorted order and then sort afterwards since that puts the "sort" penalty on the child rather than the parent getting a "lookup" penalty. A child typically only generates the list of counter identifiers once a second. The exception is an API delivery server which syncs more often but also has less counters.

For an API delivery server, a map can be used so that sorting the counters is not necessary. Preferably, an optimization can be applied by making synchronization responses from a tier 1 aggregator with a flag when the counter is unchanged. Because this will happen most of the time it will greatly reduce the response bandwidth and the updates needed on the map.

The lead world tier aggregator performs periodic sweeps of the counter tables; this is an opportunity to:

1. Process resets
2. Prune counters untouched for some configurable time period (e.g. 4 hours) and with count of 0 (or some configured low level).
3. Checkpoint to disk
4. Generate a replication dump Counter Flags As shown above in Table 4, flags are preferably a uint32_t field associated with a particular counter. Flags are stored in an AHEAD module's counter table (which in some embodiments is partitioned), and they are used in request and response messages during synchronizations.

Table 5 shows the counter flags that collectively make up the flags field shown in Table 4.

TABLE 5

Counter Flags

| Bits | Name | Value | Description |
|---|---|---|---|
| 2 | TYPE | 0: QUOTA | Type of counter |
| 3 | TIER_CONSISTENCY | 0: API Delivery Server<br>1: Tier1 Aggregator<br>2: Tier2 Aggregator<br>3: Tier3 Aggregator<br>4: Tier4 Aggregator<br>5: Tier5 Aggregator<br>6: Tier6 Aggregator<br>7: Tier7 World | At which consistency does the count belong? Each tier will update this field with MAX(current tier, highest tier). Since an AHEAD module can act in multiple roles, the highest is taken.<br>When an API delivery server encounters a new counter there is the option to block and synchronization with the tier 1 aggregator lead if the tier is "API delivery server".<br>An over quota counter with world tier consistency is no longer synced until near the reset period. For an API delivery server to set a counter to over quota state, it changes the tier back to 'API delivery server' so that the counter state gets transmitted all the way up to the world tier before stopping to synchronize.<br>When setting an over quota flag, changing the period, or the limit of the counter, API delivery server will set the tier back to API delivery server. |

TABLE 5-continued

Counter Flags

| Bits | Name | Value | Description |
|---|---|---|---|
| 3 | QUOTA_PERIOD | 0: HOUR<br>1: 6_HOUR<br>2: 12_HOUR<br>3: DAY<br>4: WEEK<br>5: MONTH | The top-tier level in the system is referred to as the world. The other tiers may not be used in a system that has less than all tiers shown at left.<br>The quota period for a counter is set in the portal (as well as other counter settings such as quota limit and counter_id) and then set in metadata and delivered as a policy as set forth in U.S. Pat. Nos. 9,509,804 and 9,654,579 and 9,667,747, and U.S. patent Publication No. 2014-018185, the contents of each of which are hereby incorporated by reference in their entireties.<br>The quota period is used to determine next reset time. If the lead world tier aggregator detects a change in the interval then the counter value is reset and a new reset time is computed. |
| 3 | SECURITY_LEVEL | 0-7 | An API delivery server sets the security level for the counter. When used, a higher level counter overwrite a lower level counter going up or down tiers. Lower level counter updates are ignored by a higher level counter going up tiers. |
| 2 | MANUAL_RESET | 0-3 | When a manual reset occurs this flag is incremented (and potentially rolled over) by the lead world tier aggregator, the count is set to the reset value, and the over quota flag is cleared. This flag is used for integrity when an API delivery server sets "over quota" and during failover when deciding if a child counter can overwrite a parent counter. If this value does not match then "over quota" flag cannot be passed up a tier. |
| 1 | OVER_QUOTA | 0 or 1 | This flag is set by an API delivery server indicating the counter is over quota. The world aggregator can clear the flag on a reset. An API delivery server can only set this flag if the counter manual reset iteration field above matches. This means the reset operation has trickled down to API delivery server from world. It prevents a race operation of an over quota status being set before an API delivery server is aware of the reset at the world tier. Other tiers also apply the same logic checking that the manual reset bits match and if not clear the over quota flag.<br>When the lead world tier aggregator sees a change in over quota status or another tier sees the over quota set by a child, the counter is put in a list that is sent to all children all the way down to tier 1. Tier 1 is aware of all counters that are over quota.<br>An optimization: over quota counters with world tier consistency are synchronized periodically (e.g., every 1 minute to 2 minutes) until the time is near (e.g., about 5 seconds) from their reset time then they start synchronizing at the usual rate.<br>API delivery servers use their locally stored quota limit and count to enforce the quota. |
| 1 | QUOTA_CONFLICT | 0 or 1 | If an API delivery server sees a counter marked as over quota disagrees, it sets this flag and sets tier consistency back to API Delivery Server so the flag synchronizes up the tiers.<br>A change in this flag causes the counter to be batched to lower tiers.<br>This flag undoes the freezing of over quota syncing. That way API Delivery Servers can get an accurate count when they disagree on over quota flag state and can determine their own over quota state.<br>This flag stays set until World resets the counter. |
| 1 | INTERVAL_PARITY | 0 or 1 | This flag is set by the lead world tier aggregator when creating reset time on an "even" period. It is used when recreating reset time on other tiers or after failover to make sure we don't miss a reset at the end of a quota period. If failover occurs near a period boundary then this flag helps determine if we just missed processing a time boundary. |
| 1 | RELAXED_SYNC | 0 or 1 | An API delivery server sets this flag indicating the counter can be synced less often, for example every 3 seconds instead of every 1 second. Typically, this is done when the counter is below a threshold of the limit. |

TABLE 5-continued

Counter Flags

| Bits | Name | Value | Description |
|---|---|---|---|
| 1 | PARTITION_TIMEOUT | 0 or 1 | When horizontal partitioning is in effect, this flag can be set on a counter for which the request to the partition times out. |
| 1 | SECURITY_LVL_ERROR | 0 or 1 | Attempt to synchronize a counter with too low of a security level for a particular connection. |
| 1 | RESP_UNMODIFIED | 0 or 1 | A response can set flags to unmodified and count to 0 indicating to child that no response processing is needed for this counter because it is unmodified. It is a perf optimization to reduce bandwidth and CPU on the child. |
| 1 | COUNT_MODIFIED | 0 or 1 | When the count is modified, this flag is set. The flag implements a pruning method for inactive counters, as follows: if this flag is still zero after a period of time (e.g. 4 hours), then the counter can be removed from the local counter table, unless it is over quota. For the world tier, the count must also be 0. If the flag is set, it gets cleared for the next cycle. Periodically (e.g., every 5 minutes), if an AHEAD module is tracking than a predetermined large number of counters (e.g., 10k, 50k, 100k, 120k, or other), then the above pruning cycle is forced. This flag is not passed between tiers. |

Counter Synchronization Logic

Figure 4:
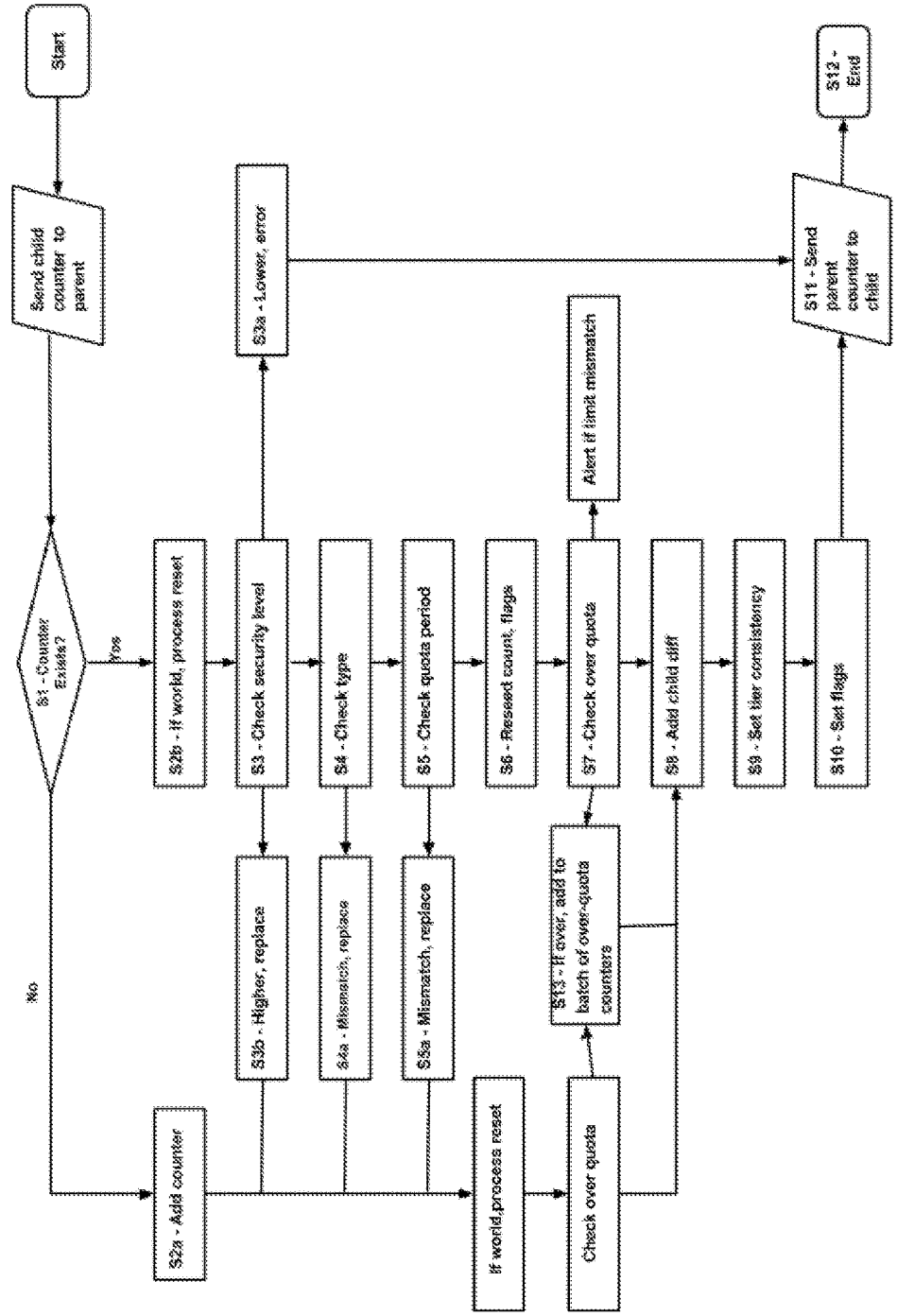
FIG. 4 is a flow diagram illustrating synchronization logic in a parent, in one embodiment.

FIG. 4 illustrates synchronization logic when a server acts as a parent. The logic starts when a child counter is sent to a parent. The steps are described below in pseudo-code.

```
S1. Check counter exists in counter table
S2. Action:
    a.    (S2a) Add counter:
              i.   add child counter to counter table
                       1.  parent flags = child flags
                       2.  parent count = child count
              ii.  process world reset: call step S16
              iii. check over quota: call step S13
              iv.  goto step S8
    b.    (S2b) Check existing counter:
              i.   process world reset: call step S16
S3. Check security level:
    a.    If parent level > child level, ignore child counter:
              i.   alert
              ii.  send SECURITY_LVL_ERROR
              iii. goto step 11
    b.    If child level > parent level, replace with child counter:
              i.   overwrite parent counter
              ii.  alert
              iii. process world reset: call step S16
              iv.  check over quota: call step S13
              v.   goto step S8
S4. Check type
    a.    if mismatch:
              i.   overwrite parent counter
              ii.  Alert
              iii. process world reset: call step 16
              iv.  check over quota: call step 13
              v.   goto step 8
S5. Check quota period
    a.    if mismatch:
              i.   parent quota period = child quota period
              ii.  If parent is world, reset counter: call step 14
              iii. Goto step 8
S6. Reseed count check if counter already exists: //only lead world will accept a count from a child,
                           // flags are same, so that count can heal if lead world
                           // fails over and the backup copy from disk is older
    a.    If [child flags] == [parent flags] and [child count] > [parent count]
              i.   parent count = child count
S7. Check child over quota, if set and parent not set:
    a.    If manual reset interval mismatch, ignore:
              i.   alert
              ii.  goto step 8
```

```
        b.      Set parent over quota
        c.      call step 13
S8.  Add child diff:
        a.      Check max child diff size (10M), if over:
                        i.   Reduce to max
                        ii.  Alert
        b.      If child diff != 0:
                        i.   Set count modified flag
        c.      If parent is world:
                        i.   parent count += child diff
                        ii.  check overflow
        d.      If parent is not world:
                        i.   parent diff += child diff
                        ii.  chekc overflow
S9.  Set tier consistency to MAX(child value, highest tier role of parent)
S10.        Set flags
S11.        Send to child:
        a.      parent count + parent diff
        b.      parent flag
S12.        END
S13.        If over quota, copy counter to batch which gets sent to all existing clients.
S14.        Reset world counter:
        a.      count=0
        b.      over quota= 0
        c.      Manual reset = 0
        d.      Call step 15
S15.        Compute world reset time:
        a.      jitter=RAND
        b.      parity=0|1
        c.      compute reset time
S16.        Process reset if parent is world:
        a.      If counter tier consistenct is world:
                        i.   check reset time and if expired, reset counter: call step 14
        b.      Else
                        i.   compute reset time: call step 15
```

Note that steps S13-S16 are not shown in FIG. 4 but are called essentially as subroutines in the pseudocode above.

Figure 5:
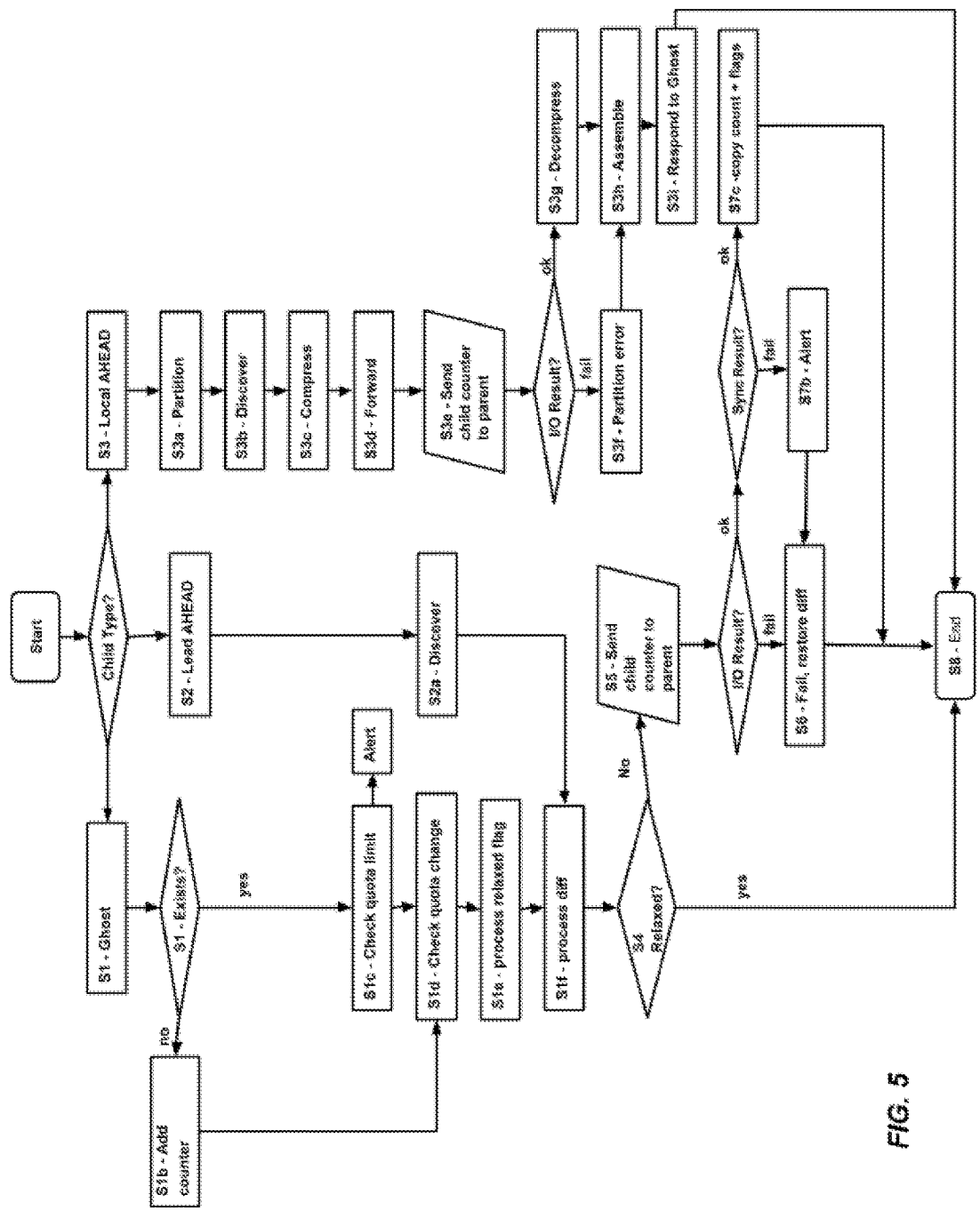
FIG. 5 is a flow diagram illustrating synchronization logic in a child, in one embodiment.

FIG. 5 illustrates synchronization logic when a server acts a child. The logic starts when a child determines it is time to synchronize with a parent. The steps are described below in pseudo-code. The starting point (S1, S2, S3) depends on whether the component is the HTTP proxy server application, local AHEAD (of the API delivery server), or a lead AHEAD module (which means a tier N aggregator acting as child).

```
S1. If 'HTTP proxy server application':
        a.   diff += increments since last sync
        b.   If new counter: set
                     i.   type=quota
                     ii.  consistency-'HTTP proxy server application'
                     iii. quota period=X
                     iv.  security level=X
        c.   If existing counter:
                     i.   If quota limit changed:
                              1.   alert
                              2.   set consistency to 'HTTP proxy server application'
        d.   If change in over quota:
                     i.   set consistency to 'HTTP proxy server application'
        e.   Process relaxed flag
                     i.   Clear relaxed sync flag
                     ii.  If under threshold of quota limit:
                              1.   Set relaxed sync flag
        f.   Process diff
                     i.   diff_to_parent = diff
                     ii.  diff = 0
S2. If lead AHEAD:
        a.   Discover
        b.   Process diff
                     i.   diff += child diffs
                     ii.  diff_to_parent = diff
                     iii. diff = 0
S3. If local AHEAD:
        a.   Partition
        b.   Discover lead AHEADs
        c.   Compress
        d.   Forward
        e.   Send to parent
        f.   Partition error? Goto 3h
``` g. Decompress
h. Assemble
i. Respond to 'HTTP proxy server application'
j. Goto step 9
S4. Check for skipping a sync:
   a. If flags has RELAXED_SYNC, skip appropriate number of sync cycles, goto step 8
   b. If over quota and consistency is world:
      i. if 1m to 2m have passed
         1. Goto step 5
      ii. Check start_sync, if >= then
         1. reset start_sync
         2. Goto step 5
      iii. goto step 8
S5. Send to parent:
   a. If Lead AHEAD:
      i. Compress
   b. Send counter fields
      i. child counter_id
      ii. child diff_to_parent
      iii. child count
      iv. child flags
S6. Fail to receive response:
   a. child diff += child diff_to_parent
S7. Receive response (parent count, parent flags):
   a. If lead AHEAD:
      i. Decompress
   b. If parent flag = PARTITION_TIMEOUT or SECURITY_LVL_ERROR:
      i. alert
      ii. child diff += child diff_to_parent
   c. Else:
      i. child count = parent count
      ii. child flags = parent flags
         1. Exclude certain parent flags:
            a. TYPE
            b. QUOTA_PERIOD
            c. SECURITY_LEVEL
            d. RELAXED_SYNC
            e. COUNT_MODIFIED
S8. END Protecting Against Counter Loss To protect against loss of counters that are not actively synchronized, the backup candidates for the lead world tier aggregator will request a full counter dump from the lead world tier aggregator and checkpoint it to disk. This occurs on a periodic basis (e.g., every 5 seconds). The lead world tier aggregator will checkpoint all counters to its own disk or other mass storage periodically as well.

If a world tier candidate it becomes lead, such as on startup or upon leadership change, then the candidate will load the file. Counters are processed for reset before use. The checksum of the file is verified before use. If the file is bad an alert is raised and the next archived version is used.

Counter Purge

Eventually, old counters age out of the system per the pruning approach outlined earlier. As a result, it is preferable to have the portal protect against a user deploying new key identifiers, using them in counters, deleting them, and then repeating, as this will cause the lead world tier aggregator to accumulate unused counters. To address this, the portal can track deleted keys and only recycle them (e.g., after 90 days last activity). The portal can also have the option of deleting counters from the lead world tier aggregator using the manual reset with a delete flag.

To remove over quota counters that have reset so they do not cause a large synchronization load on the aggregators and/or API delivery servers, counters are dropped by their tier if they have a count of zero after a configured period past their reset time. Preferably this period defaults to 10 seconds past the reset time including jitter plus an extra 2 seconds per tier number.

Upon failover of an aggregator, state kept by the aggregator needs to be recreated on restart. To support reseeding of counter state upon failover, when a child syncs with a parent it sends for each counter the last known count and flags. The parent can then recreate state for that counter if the counter does not exist in the counter table. If the counter does exist in the counter table but the child count is greater, then as long the flags match the child count can be used.

Over Quota Handling

Each API delivery server is responsible for signaling a counter over quota state when detected. When the state changes, an API delivery server sets the counter consistency level to 'API delivery server' and synchronizes the counter with its parent. Each tier will notice a change in over quota state for that counter and add the counter to the update batch of over quota counters. Preferably, the world tier or an intermediate tier aggregator will from time to time generate a batch update (reflecting the updates) and send it to all of its children. This batch is sent by appending it to the response to a child request. This ensures all regions will know about all over quota counters as quickly as possible. Preferably the updated batch then exists on all of the first tier aggregators, and/or on the delivery servers themselves.

Once an over quota counter reaches world tier consistency, the lead world tier aggregator stops the counter from being further synchronized by setting the start_sync time field in the counter table to some small time before the reset period, e.g., 5 seconds before the reset time. Upon a manual reset, the lead world tier aggregator will push a change causing it to no longer be over quota and begin synchronizing again. Otherwise when a lower tier iterates counters for synchronization, it will skip synchronizing over quota counters either until they reach start_sync time (and at that point reset the counter to zero) or once every, e.g., 1 to 2 minutes given by random jitter, as a failsafe in case of missing a manual reset push.

To remove over quota counters that have reset, so they don't cause a large synchronization load on that AHEAD modules, counters are dropped if they have a count of zero after a fixed period past their reset time.

If an API delivery server changes the quota limit, then the consistency level is set to 'API delivery server' again and synchronization resumes.

Preferably, there are 2 batches of over quota counters generated by an AHEAD module:
1. Full batch: this batch contains all counters that are currently 'over quota' or that have been manually reset. It is sent in its entirety, when a new client persistent connection is established, by adding it to the response to the first request. It is created by iterating the counter table and copying all counters that are marked as being over quota. It is invalidated as soon as any counter changes it over quota state.
2. Update batch: this batch is sent over existing persistent connections that have already received the full batch. It contains updates (e.g., newly over quota or manual resets) from lower tiers and upper tiers if any. Once this batch has been sent to all clients, it is discarded.

Upon receipt of a batch, any counters in the batch that are not present in the counter table are added. The batch contains counter_id, flags, and count. If the batch has a manual reset then the AHEAD module overwrites a counter that is over quota. Also if the batch has a counter marked as over quota with a lower consistency level than itself, then it overwrites a counter in order to allow an API delivery server to synchronize upwards a change in quota period, quota limit, or security level.

Batches are configured to be sent all the way down to tier 1. It is configurable and can be changed to sent down to the delivery tier 100.

If an API delivery server disagrees on the over quota status, meaning the flag is set but the API delivery server believes based on the count and its view of the quota that it is not over quota, then that API delivery server sets the quota-conflict flag, sets tier consistency to 'API delivery server', so that the quota-conflict flag spreads up and down the tiers. At each tier, the batching logic described above applies to the change in this flag. This flag also means the synchronization freeze must stop. This logic prevents a straggler API delivery server from incorrectly marking a counter as 'over quota' and thereby errantly causing denials of service on other API delivery servers for that counter. At that point, all API delivery servers make their own determination about the over quota status based on count and quota limit. The new flag undoes synchronization freezing so all API delivery servers can get updated counts. This flag is reset when the counter is reset.

Synchronization Request and Response Messages

The following header is used as a request header (Table 6):

TABLE 6

AHEAD request header

| Field | Type | Description |
| --- | --- | --- |
| version | uint32 | Version number |
| partition_id | uint32 | This field is for implementation of horizontal scaling by hashing counters to partitions each with its own hierarchy of aggregators. Such partitioning is optional and if unused, neither is this field. |
| request type | uint32 | TYPE_SYNC (send/receive counters) |
|  |  | TYPE_DUMP (receive all counters) |
|  |  | TYPE_HEARTBEAT (no body) |
|  |  | TYPE_HELLO (no body) |
|  |  | TYPE_BYE (no body) |
|  |  | TYPE_PARENT_CHANGE (parent change due to mapping update) |
| record_count | uint32 | Number of records of the given type following this header |
| data_size | uint32 | Size of data following this header for given type |
| flags | uint32 | Tier of receiver |
|  |  | 0: TIER_NONE (API Delivery Server) |
|  |  | 1: TIER_1 |
|  |  | 2: TIER_2 |
|  |  | 3: TIER_3 |
|  |  | 4: TIER_4 |
|  |  | 5: TIER_5 |
|  |  | 6: TIER_6 |
|  |  | 7: TIER_7 |
|  |  | 8: TIER_WORLD |
|  |  | Other flags |
|  |  | 9: COMPRESSED |
|  |  | 10: NEXT_HEADER (expect another header after body) |
| hop_count | uint32 | Hop count |
| ip | IP | Machine IP address of sender (excluding tunneling) |

The following record is used to request a counter update and follow the header. The list of records are preferably sorted by counter_id to allow delta encoding on the counter_id before compression.

TABLE 7

AHEAD Request Record

| Field | Type | Description |
| --- | --- | --- |
| Counter_id | uint64 | A unique identifier across the network; see Table 1. |
| count | uint32 | Count as seen by the child requesting sync, for reseeding state. The count belongs to a particular tier. |
| diff | uint32 | Difference value to apply to count |
| flags | uint32 | See Table 5 |

The following header is used as a response header.

TABLE 8

AHEAD Response Header

| Field | Type | Description |
| --- | --- | --- |
| version | uint32 | version number |
| type | uint32 | TYPE_SYNC (send updates for given counters) TYPE_DUMP (send all counters) TYPE_HEARTBEAT (no body) TYPE_HELLO (no body) TYPE_BYE (no body, close connection) TYPE_SR_CHANGE (leader change due to SR-assign update) TYPE_OVERQUOTA (send extra over quota counters) |
| partition_id | uint32 | Partition identifier (if used) |
| record_count | uint32 | Number of records of given type following this header |
| data_size | uint32 | Size of data following this header for given type |
| flags | uint32 | BUSY_BACKOFF = 1 << 0 RESP_COMPRESSED = 1 << 1 RESP_NEXT_HEADER = 1 << 2 FAILED_NOT_WORLD_CANDIDATE = 1 << 3 FAILED_FWD_TIMEOUT = 1 << 4 FAILED_FWD_HOP_COUNT = 1 << 6 FAILED_REQ_TYPE = 1 << 7 FAILED_ROLE_TRANSITION = 1 << 8 LOCAL_AHEAD_WRITE_TIMEOUT = 1 << 9 LOCAL_AHEAD_READ_TIMEOUT = 1 << 10 WORLD_CANDIDATE_FORWARD_FAILED = 1 << 11 RESP_FWD_PROXY = 1 << 12 |
| cpu_load-units | uint32 | CPU load to charge against service baseload (for load balancing) |
| egress_bits | uint64 | Frontend egress bits to charge against baseload (for load balancing) |
| last_reset_time | int64 | Epoch time of last reset done by World. Used by World candidates becoming World lead to ensure quota resets are performed. (World lead sets this field only) |
| manual_reset_seq_id | uint32 | Last sequence id of manual reset. Used by world candidates becoming leader for integrity of manual resets from Portal, (world lead sets this field only) |
| ip | IP | Machine IP address of sender (excluding tunneling) |

The following record is used to publish aggregated counts down the hierarchy for each counter_id presented in the request.

TABLE 9

AHEAD Response Record

| Field | Type | Description |
| --- | --- | --- |
| count | uint32 | Aggregated count |
| flags | uint32 | See Table 5 |

The following record is used to publish counters that are over quota and sent from a higher tier. The higher tier will send any new over quota counters received to its children. A new child connection receives the whole list. This record can also be used as a response dump.

TABLE 10

AHEAD Over Quota Response

| Field | Type | Description |
| --- | --- | --- |
| counter_id | uint64 | Counter identifier as key, see Table 3 |
| count | uint32 | Aggregated count |
| flags | uint32 | See Table 5 |

The following message can be used to tell a child that a parent has changed due to e.g., a mapping change.

TABLE 11

Parent Change

| Name | Type | Description |
|---|---|---|
| reply | uint32 | 0 = no reply expected<br>1 = child should reply with Parent Change confirmation and status |
| regions[16] | uint32 | Region data. Value 0 for empty field. |
| hosts[16] | IP | Host data. All 0 for empty field |

Horizontal Partitioning

Horizontal partitioning is scaling technique and can be applied both within process and across servers.

An embodiment of horizontal partitioning is now described. Within process, an AHEAD module will default to using one or two hash tables which will allow full utilization of one or two CPU cores including the overhead of compression/decompression of messages and TLS. The counter tables can be segmented using lowest order bits of the counter identifiers. The in-cluster refresh rate (i.e., API delivery servers to tier 1 in FIG. 3) as well as the 'max counters per machine' setting can be configured so that only one CPU core is generally used. If the max counters per machine needs to be increased, then AHEAD will be ready to use more CPU cores.

Across machines, horizontal partitioning of the counter identifier numerical space (which is the key for locating the counter record in the counter table) allows further scaling by creating multiple AHEAD hierarchies, one handling each partition.

The AHEAD configuration defines partitions by specifying for each partition a list of numerical ranges, an optional mask, tier maps, and hostname (for parent lookup).

When the HTTP proxy server application of an API delivery server sends a list of counters to its local AHEAD module via UNIX domain sockets, AHEAD will check if multiple partitions exist in the configuration, and if so, will split the list of counters by partition and forward each list to its corresponding partition lead. The message header is updated by the AHEAD module with the partition identifier so that upper tiers know which partition the counters belong. Once each partition responds, the AHEAD module assembles the response and sends it to the HTTP proxy server application. If a partition response timed out, the corresponding counters are marked with a PARTITION_TIMEOUT flag and the HTTP proxy server application will ignore those updates.

Re-partitioning requires splitting the world tier aggregator state by counter-id range and sending corresponding counters to the lead world tier aggregator in each hierarchy. Re-partitioning occurs when a configuration change in the partitions is detected. When a collision occurs during re-partitioning, for example the new partition already has a counter for one provided in the re-partition dump, the new partition keeps its counter since self-healing provided the latest state for it.

Figure 6:
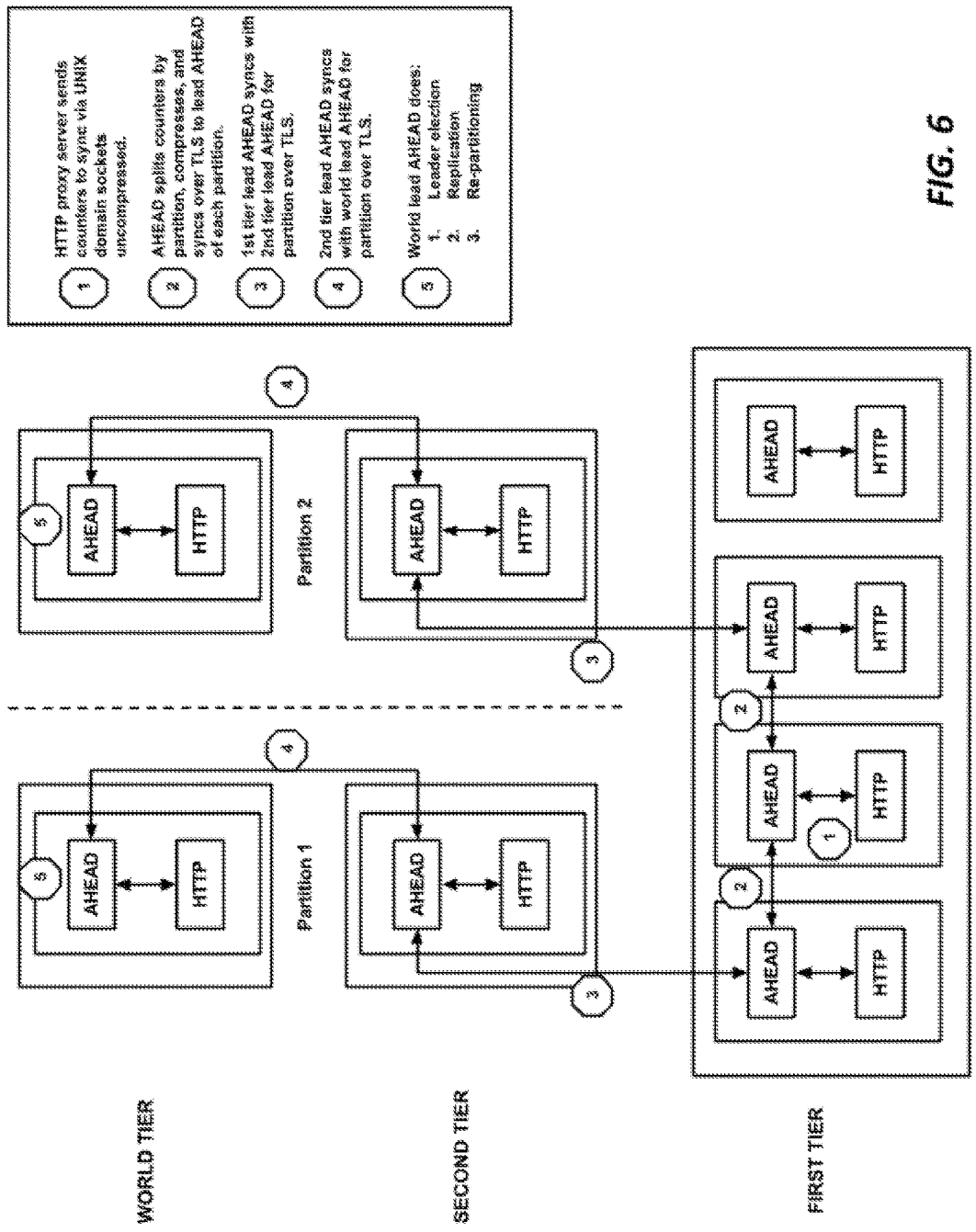
FIG. 6 is a block diagram illustrating horizontal partitioning, in one embodiment; and, FIG. 7 is a block diagram illustrating hardware in a computer system that may be used to implement the teachings hereof.

FIG. 6 illustrates horizontal partitioning across machines in the system, in one embodiment.

Horizontal partitioning across machines results in more tier 1 aggregators each with network and CPU usage. Tiering and latency can be customized per partition. Partitions can share the same DNS maps and hostnames, or can have different maps and number of tiers. The DNS system will try and prevent different hos from colliding.

Usage Metrics

In the description above, the example of a client device request count was given as a non-limiting example of the usage metric. However, a wide variety of metrics may be used to measure usage.

The use of the request account as the usage metric is flexible. This is because a counter identifier can be defined as corresponding to any of a variety of data extracted from a client request. This may be refined by counting certain types of requests, or requests from certain client devices, from certain IP addresses or ranges, from certain users or user groups, or from certain locations. The system may handle many such counts simultaneously. For example, there could be a quota for client device requests made from a first office of an enterprise, and a separate quota for requests made from a second office.

Computer Based Implementation

The teachings hereof may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 7:
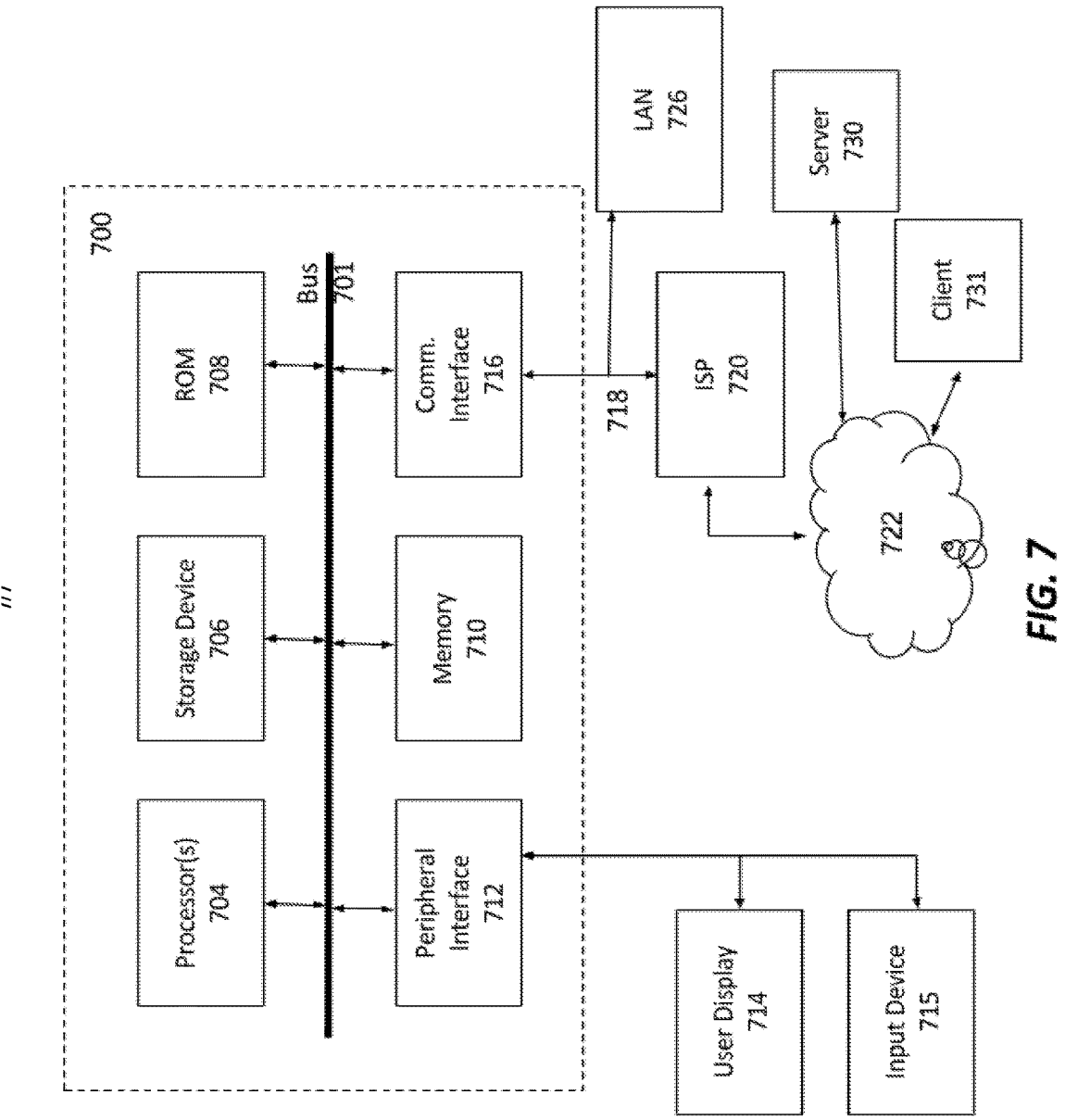

FIG. 7 is a block diagram that illustrates hardware in a computer system 700 upon which such software may run in order to implement embodiments of the invention. The computer system 700 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 700 includes a microprocessor 704 coupled to bus 701. In some systems, multiple processor and/or processor cores may be employed. Computer system 700 further includes a main memory 710, such as a random access memory (RAM) or other storage device, coupled to the bus 701 for storing information and instructions to be executed by processor 704. A read only memory (ROM) 708 is coupled to the bus 701 for storing information and instructions for processor 704. A non-volatile storage device 706, such as a magnetic disk, solid state memory (e.g., flash memory), or optical disk, is provided and coupled to bus 701 for storing information and instructions. Other application-specific integrated circuits (ASICs), field programmable gate arrays (FPGAs) or circuitry may be included in the computer system 700 to perform functions described herein.

A peripheral interface 712 communicatively couples computer system 700 to a user display 714 that displays the output of software executing on the computer system, and an input device 715 (e.g., a keyboard, mouse, trackpad, touchscreen) that communicates user input and instructions to the computer system 700. The peripheral interface 712 may include interface circuitry, control and/or level-shifting logic for local buses such as RS-485, Universal Serial Bus (USB), IEEE 1394, or other communication links.

Computer system 700 is coupled to a communication interface 717 that provides a link (e.g., at a physical layer, data link layer, or otherwise) between the system bus 701 and an external communication link. The communication interface 716 provides a network link 718. The communication interface 716 may represent a Ethernet or other network interface card (NIC), a wireless interface, modem, an optical interface, or other kind of input/output interface.

Network link 718 provides data communication through one or more networks to other devices. Such devices include other computer systems that are part of a local area network (LAN) 726. Furthermore, the network link 718 provides a link, via an internet service provider (ISP) 720, to the Internet 722. In turn, the Internet 722 may provide a link to other computing systems such as a remote server 730 and/or a remote client 731. Network link 718 and such networks may transmit data using packet-switched, circuit-switched, or other data-transmission approaches.

In operation, the computer system 700 may implement the functionality described herein as a result of the processor executing code. Such code may be read from or stored on a non-transitory computer-readable medium, such as memory 710, ROM 708, or storage device 506. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 718 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A distributed computing system for tracking usage of a service provided by servers in the distributed computing system, the system comprising:

A. a delivery tier comprising a plurality of service delivery servers, each of which receives and serves client device requests for a service provided by the distributed computing system, the service being associated with a hostname included in the client device requests;

B. a first aggregation tier comprising one or more first aggregation servers, each of which is a parent to one or more of the service delivery servers for purposes of synchronizing usage measurements for the service;

C. a second aggregation tier comprising one or more second aggregation servers, each of which is a parent to one or more of the first aggregation servers for purposes of synchronizing usage measurements for the service;

D. each of the plurality of service delivery servers operable to repeatedly execute a first synchronization operation with its respective parent;

E. the first synchronization operation comprising:
  i) a given service delivery server sending a message comprising an identifier and a first delta value representing incremental usage of the service measured by the given service delivery server since a previous synchronization operation with the parent first aggregation server;
  ii) the parent first aggregation server processing the message at least by: adding the first delta value from the given service delivery server to the parent first aggregation server's locally-stored usage measurement for the service, to create an updated usage measurement for the service, and adding the first delta value to a second delta value locally-stored by the parent first aggregation server representing incremental usage of the service any of measured by and reported to the parent first aggregation server since a previous synchronization operation with a parent second aggregation server;
  iii) the parent first aggregation server transmitting to the service delivery server a response to the message, the response comprising: the updated usage measurement for the service;
  iv) the given service delivery server updating the given service delivery server's locally-stored usage measurement for the service to be equal to the updated usage measurement received from the parent first aggregation server;

F. each of the plurality of first aggregation servers operable to repeatedly execute a second synchronization operation with its respective parent;

G. the second synchronization operation comprising:
  i) a given first aggregation server sending a message comprising the identifier and a third delta value representing usage of the service any of measured by and reported to the given first aggregation server since a previous synchronization operation with a parent second aggregation server;
  ii) the parent second aggregation server processing the message at least by: adding the third delta value from the first aggregation server to the parent second aggregation server's locally-stored usage measurement for the service, to create an updated usage measurement for the service, and adding the third delta value to a fourth delta value locally-stored by the parent second aggregation server and representing usage of the service any of measured by and reported to the parent second aggregation server since a previous synchronization operation with a parent thereof;

iii) the parent second aggregation server transmitting to the given first aggregation server a response to the message, the response comprising: the updated usage measurement for the service;
iv) the given first aggregation server performing any of: updating the given first aggregation server's locally-stored usage measurement for the service to be equal to the updated usage measurement received from the parent second aggregation server, and skipping an updating process due to a flag received in the response that indicates that the given first aggregation server's locally-stored usage measurement for the service is already equal to the updated usage measurement received from the parent second aggregation server;

H. each of the plurality of service delivery servers operable to repeatedly execute a quota enforcement operation, comprising:
i) a given service delivery server receiving a client device request for the service;
ii) checking the value of the service delivery server's locally-stored usage measurement for the service against a locally-stored quota for the service, in order to determine whether the locally-stored quota for the service has been exceeded, and if so, blocking the client device request, and if not, allowing the client device request.

2. The system of claim 1, further comprising a world aggregation tier that is operable to periodically transmit resets for quotas associated with the service, the resets being received by service delivery servers and causing service delivery servers to set locally-stored usage measurements for the service to zero.

3. The system of claim 1, wherein each of the plurality of service delivery servers comprises any of an HTTP server application and an HTTP proxy server application.

4. The system of claim 1, wherein at least one of the first aggregation servers resides in a data center with service delivery servers for which it acts as a parent.

5. The system of claim 1, wherein the locally-stored quota comprises a limit on the number of client device requests made to the distributed computing system for the service.

6. The system of claim 1, wherein any of: (a) the service is one of one or more services for an API, the API being delivered by the distributed computing platform, (b) the service provides access to a web application, and (c) each of the plurality of service delivery servers determines the service that a client device requests based on any of: the hostname, at least a portion of a URL path, a URL query parameter.

7. The system of claim 1, wherein the execution of the first synchronization operation is any of: periodic and asynchronous, and the execution of the second synchronization operation is any of: periodic and asynchronous.

8. The system of claim 1, wherein the usage measurement comprises a numerical count of client device requests for the service.

9. The system of claim 1, wherein each of the plurality of the service delivery servers operates to store a list of identifiers associated with usage measurements for services that are over-quota, and suppress the first synchronization operation with respect to said over-quota usage measurements of services.

10. The system of claim 1, wherein, for at least one of the first and second synchronization operations, the respective message comprises a flag indicating that usage of the service is over-quota.

11. The system of claim 1, wherein each of the plurality of service delivery servers is operable to locally store a usage measurement that is associated with an identifier in a first partition, and a usage measurement that is associated with an identifier in a second partition, the first and second partitions being distinct;
and wherein each of the plurality of service delivery servers has a parent first aggregation server for synchronization with respect to the identifier in the first partition, and another parent server for synchronization with respect to the identifier in the second partition.

12. A method performed by a distributed computing system for tracking usage of a service provided by servers in the distributed computing system, the distributed computing system having A. a delivery tier comprising a plurality of service delivery servers, each of which receives and serves client device requests for a service provided by the distributed computing system, the service being associated with a hostname included in the client device requests, B. a first aggregation tier comprising one or more first aggregation servers, each of which is a parent to one or more of the service delivery servers for purposes of synchronizing usage measurements for the service, and C. a second aggregation tier comprising one or more second aggregation servers, each of which is a parent to one or more of the first aggregation servers for purposes of synchronizing usage measurements for the service,
the method comprising:
D. at each of the plurality of service delivery servers, repeatedly executing a first synchronization operation with its respective parent, the first synchronization operation comprising:
i) a given service delivery server sending a message comprising an identifier and a first delta value representing incremental usage of the service measured by the given service delivery server since a previous synchronization operation with the parent first aggregation server;
ii) the parent first aggregation server processing the message at least by: adding the first delta value from the given service delivery server to the parent first aggregation server's locally-stored usage measurement for the service, to create an updated usage measurement for the service, and adding the first delta value to a second delta value locally-stored by the parent first aggregation server representing incremental usage of the service any of measured by and reported to the parent first aggregation server since a previous synchronization operation with a parent second aggregation server;
iii) the parent first aggregation server transmitting to the service delivery server a response to the message, the response comprising: the updated usage measurement for the service;
iv) the given service delivery server updating the given service delivery server's locally-stored usage measurement for the service to be equal to the updated usage measurement received from the parent first aggregation server;
E. at each of the plurality of first aggregation servers, repeatedly executing a second synchronization operation with its respective parent, the second synchronization operation comprising:
i) a given first aggregation server sending a message comprising the identifier and a third delta value representing usage of the service any of measured by and reported to the given first aggregation server since a previous synchronization operation with a parent second aggregation server;
ii) the parent second aggregation server processing the message at least by: adding the third delta value from the first aggregation server to the parent second aggregation server's locally-stored usage measurement for the service, to create an updated usage measurement for the service, and adding the third delta value to a fourth delta value locally-stored by the parent second aggregation server and representing usage of the service any of measured by and reported to the parent second aggregation server since a previous synchronization operation with a parent thereof;
iii) the parent second aggregation server transmitting to the given first aggregation server a response to the message, the response comprising: the updated usage measurement for the service;
iv) the given first aggregation server performing any of: updating the given first aggregation server's locally-stored usage measurement for the service to be equal to the updated usage measurement received from the parent second aggregation server, and skipping an updating process due to a flag received in the response that indicates that the given first aggregation server's locally-stored usage measurement for the service is already equal to the updated usage measurement received from the parent second aggregation server;
F. at each of the plurality of service delivery servers, repeatedly executing a quota enforcement operation, comprising:
i) a given service delivery server receiving a client device request for the service;
ii) checking the value of the service delivery server's locally-stored usage measurement for the service against a locally-stored quota for the service, in order to determine whether the locally-stored quota for the service has been exceeded, and if so, blocking the client device request, and if not, allowing the client device request.

13. The method of claim 12, further comprising, with a world aggregation tier, periodically transmitting resets for quotas associated with the service, the resets being received by service delivery servers and causing service delivery servers to set locally-stored usage measurements for the service to zero.

14. The method of claim 12, wherein each of the plurality of service delivery servers comprises any of an HTTP server application and an HTTP proxy server application.

15. The method of claim 12, wherein at least one of the first aggregation servers resides in a data center with service delivery servers for which it acts as a parent.

16. The method of claim 12, wherein the locally-stored quota comprises a limit on the number of client device requests made to the distributed computing system for the service.

17. The method of claim 12, wherein any of: (a) the service is one of one or more services for an API, the API being delivered by the distributed computing platform, (b) the service provides access to a web application, and (c) each of the plurality of service delivery servers determines the service that a client device requests based on any of: the hostname, at least a portion of a URL path, a URL query parameter.

18. The method of claim 12, wherein the execution of the first synchronization operation is any of: periodic and asynchronous, and the execution of the second synchronization operation is any of: periodic and asynchronous.

19. The method of claim 12, wherein the usage measurement comprises a numerical count of client device requests for the service.

20. The method of claim 12, wherein each of the plurality of the service delivery servers stores a list of identifiers associated with usage measurements for services that are over-quota, and suppress the first synchronization operation with respect to said over-quota usage measurements of services.

21. The method of claim 12, wherein, for at least one of the first and second synchronization operations, the respective message comprises a flag indicating that usage of the service is over-quota.

22. The method of claim 12, wherein each of the plurality of service delivery servers locally stores a usage measurement that is associated with an identifier in a first partition, and a usage measurement that is associated with an identifier in a second partition, the first and second partitions being distinct;
and wherein each of the plurality of service delivery servers has a parent first aggregation server for synchronization with respect to the identifier in the first partition, and another parent server for synchronization with respect to the identifier in the second partition.

23. A distributed computing system for tracking usage of a service provided by one or more servers in the distributed computing system, the system comprising:
A. a delivery tier comprising a plurality of service delivery servers, each of which operates to receive and serve client device requests for a service provided by the distributed computing system, the service being associated with a hostname included in the client device requests;
B. one or more intermediate tiers, each intermediate tier comprising one or more aggregation servers,
(i) each of the one or more aggregation servers in the lowest tier of the one or more intermediate tiers operable to repeatedly execute a first synchronization operation with one or more of the plurality of service delivery servers, for purposes of synchronizing usage measurements for the service;
(ii) each of the one or more aggregation servers in the highest tier of the one or more intermediate tiers operable repeatedly execute a second synchronization operation with a world aggregation server, for purposes of synchronizing usage measurements for the service;
C. the first synchronization operation comprising:
i) a service delivery server sending a message comprising an identifier and a first delta value representing usage of the service measured by the service delivery server since a previous synchronization operation with the lowest tier;
ii) a lowest tier aggregation server processing the message at least by: adding the first delta value from the service delivery server to the lowest tier aggregation server's locally-stored usage measurement for the service, to create an updated usage measurement for the service, and adding the first delta value to a second delta value locally-stored by the lowest tier aggregation server representing usage of the service any of measured by and reported to the lowest tier aggregation server since a previous synchronization operation with a higher tier;

iii) the lowest tier aggregation server transmitting to the service delivery server a response to the message, the response comprising: the updated usage measurement for the service;
iv) the service delivery server updating the service delivery server's locally-stored usage measurement for the service to be equal to the updated usage measurement for the service received in the response from the lowest tier aggregation server;

D. the second synchronization operation comprising:
i) a highest tier aggregation server sending a message comprising the identifier and a third delta value representing usage of the service any of measured by and reported to the highest tier aggregation server since a previous synchronization operation with the world aggregation server;
ii) the world aggregation server processing the message at least by: adding the third delta value from the highest tier aggregation server to the world aggregation server's locally-stored usage measurement for the service, to create an updated usage measurement for the service;
iii) the world aggregation server transmitting to the highest tier aggregation server a response to the message, the response comprising: the updated usage measurement for the service;
iv) the highest tier aggregation server updating the highest tier aggregation server's locally-stored usage measurement for the service to be equal to the updated measurement for the service received in the response from the world aggregation server;

E. each of the plurality of service delivery servers repeatedly executing a quota enforcement operation, comprising:
i) a given service delivery server receiving a client device request for the service;
ii) checking the value of the given service delivery server's locally-stored usage measurement for the service against a locally-stored quota for the service, in order to determine whether the locally-stored quota for the service has been exceeded, and if so, blocking the client device request, and if not, allowing the client device request.

24. A method performed by a distributed computing system for tracking usage of a service provided by one or more servers in the distributed computing system, the distributed computing system having A. a delivery tier comprising a plurality of service delivery servers, each of which operates to receive and serve client device requests for a service provided by the distributed computing system, the service being associated with a hostname included in the client device requests, B. one or more intermediate tiers, each intermediate tier comprising one or more aggregation servers, the method comprising:
C. with each of the one or more aggregation servers in the lowest tier of the one or more intermediate tiers repeatedly executing a first synchronization operation with one or more of the plurality of service delivery servers, for purposes of synchronizing usage measurements for the service;
D. with each of the one or more aggregation servers in the highest tier of the one or more intermediate tiers repeatedly executing a second synchronization operation with a world aggregation server, for purposes of synchronizing usage measurements for the service;

E. the first synchronization operation comprising:
i) a service delivery server sending a message comprising an identifier and a first delta value representing usage of the service measured by the service delivery server since a previous synchronization operation with the lowest tier;
ii) a lowest tier aggregation server processing the message at least by: adding the first delta value from the service delivery server to the lowest tier aggregation server's locally-stored usage measurement for the service, to create an updated usage measurement for the service, and adding the first delta value to a second delta value locally-stored by the lowest tier aggregation server representing usage of the service any of measured by and reported to the lowest tier aggregation server since a previous synchronization operation with a higher tier;
iii) the lowest tier aggregation server transmitting to the service delivery server a response to the message, the response comprising: the updated usage measurement for the service;
iv) the service delivery server updating the service delivery server's locally-stored usage measurement for the service to be equal to the updated usage measurement for the service received in the response from the lowest tier aggregation server;

F. the second synchronization operation comprising:
i) a highest tier aggregation server sending a message comprising the identifier and a third delta value representing usage of the service any of measured by and reported to the highest tier aggregation server since a previous synchronization operation with the world aggregation server;
ii) the world aggregation server processing the message at least by: adding the third delta value from the highest tier aggregation server to the world aggregation server's locally-stored usage measurement for the service, to create an updated usage measurement for the service;
iii) the world aggregation server transmitting to the highest tier aggregation server a response to the message, the response comprising: the updated usage measurement for the service;
iv) the highest tier aggregation server updating the highest tier aggregation server's locally-stored usage measurement for the service to be equal to the updated measurement for the service received in the response from the world aggregation server;

G. each of the plurality of service delivery servers repeatedly executing a quota enforcement operation, comprising:
i) a given service delivery server receiving a client device request for the service;
ii) checking the value of the given service delivery server's locally-stored usage measurement for the service against a locally-stored quota for the service, in order to determine whether the locally-stored quota for the service has been exceeded, and if so, blocking the client device request, and if not, allowing the client device request.

\* \* \* \* \*